3,420,141
POSITIONER FOR A MEMBER SUCH AS A MACHINE TOOL SPINDLE
Robert Z. Hague, Oradell, N.J., John S. Ballard, East Aurora, and John J. Lewlew, Williamsville, N.Y., and Franklin G. Miller, Passaic, N.J., assignors to Moog, Inc., East Aurora, N.Y., a corporation of New York
Filed Sept. 19, 1966, Ser. No. 580,453
U.S. Cl. 90—14      31 Claims
Int. Cl. B23c 1/00

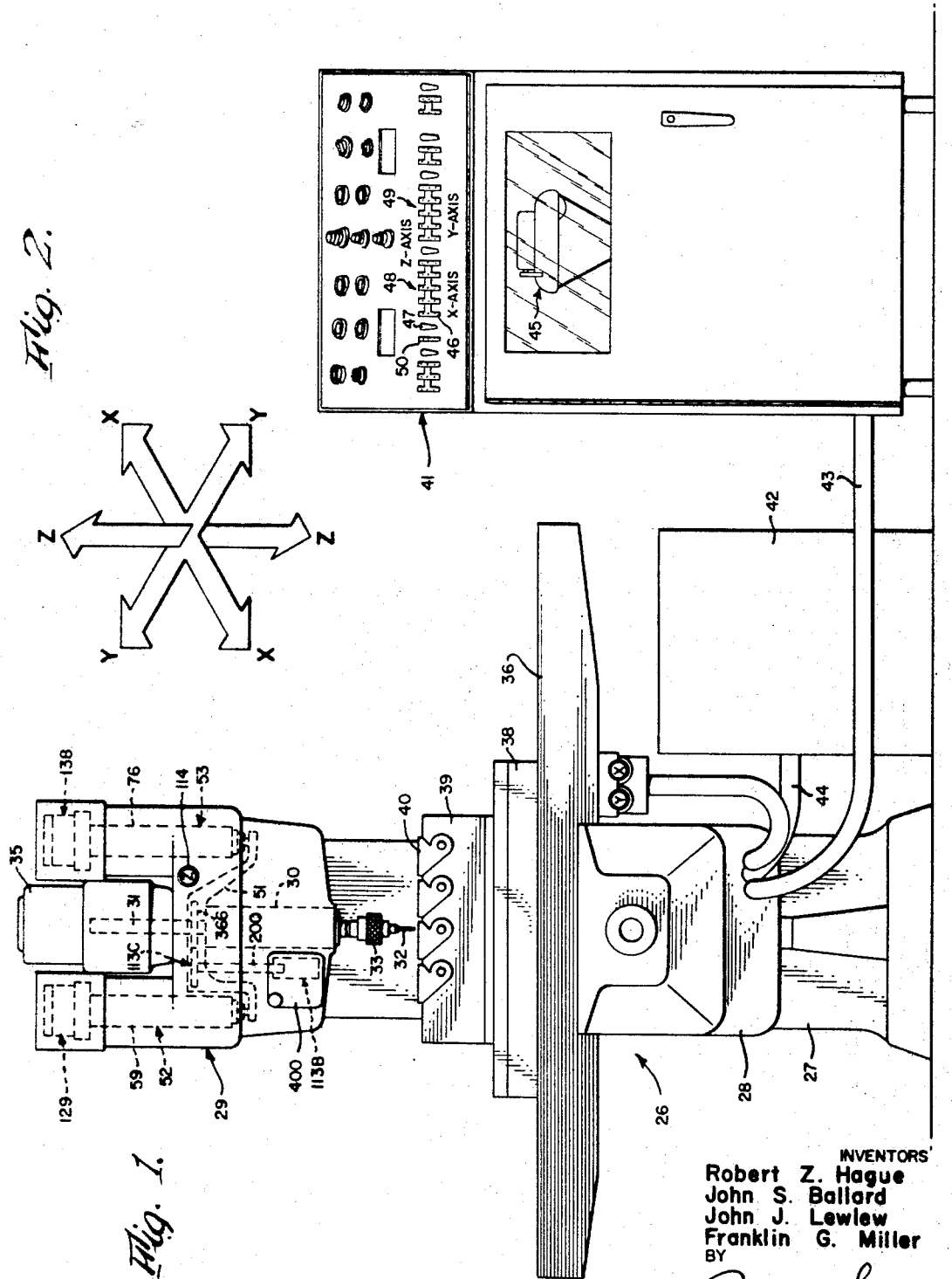

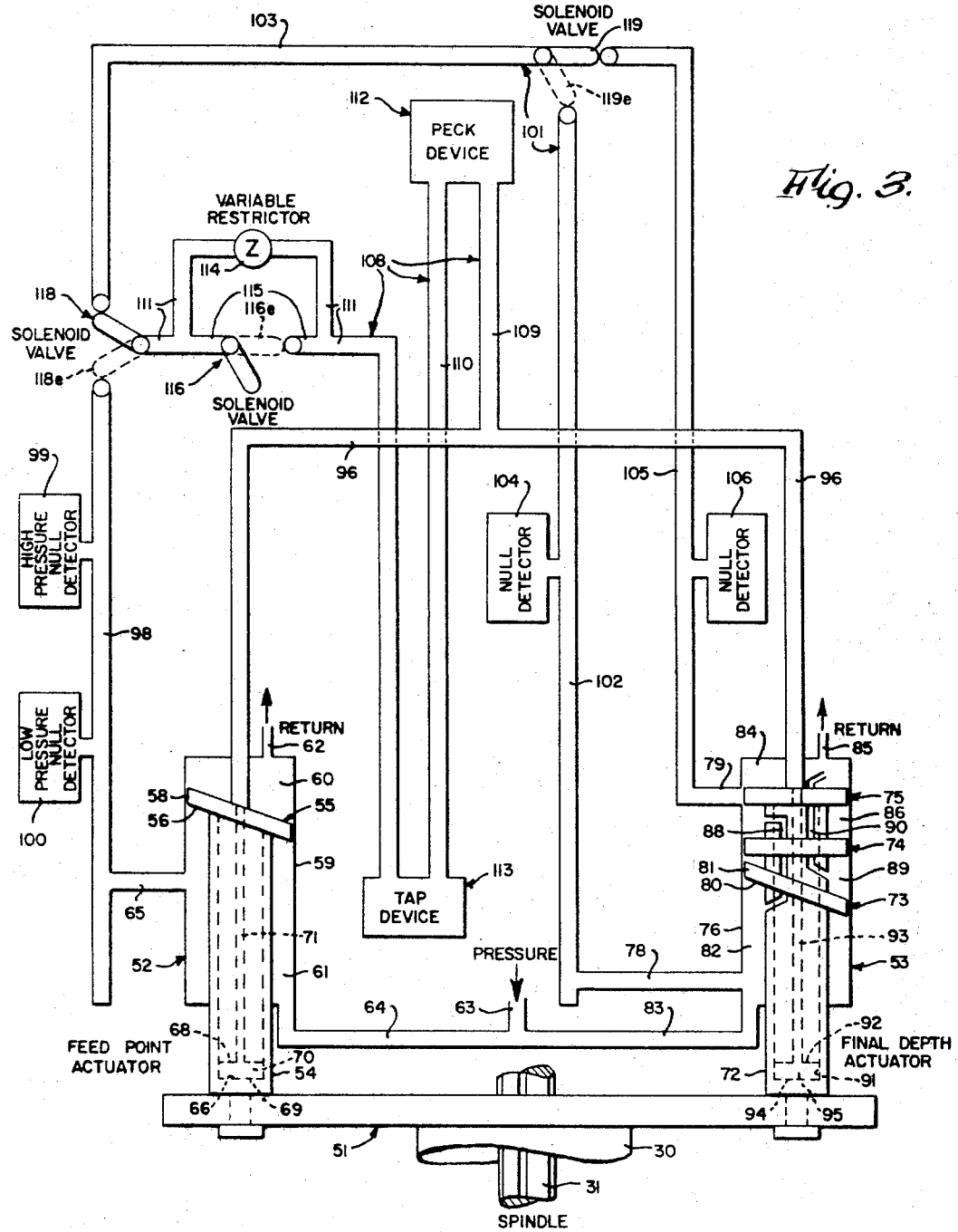

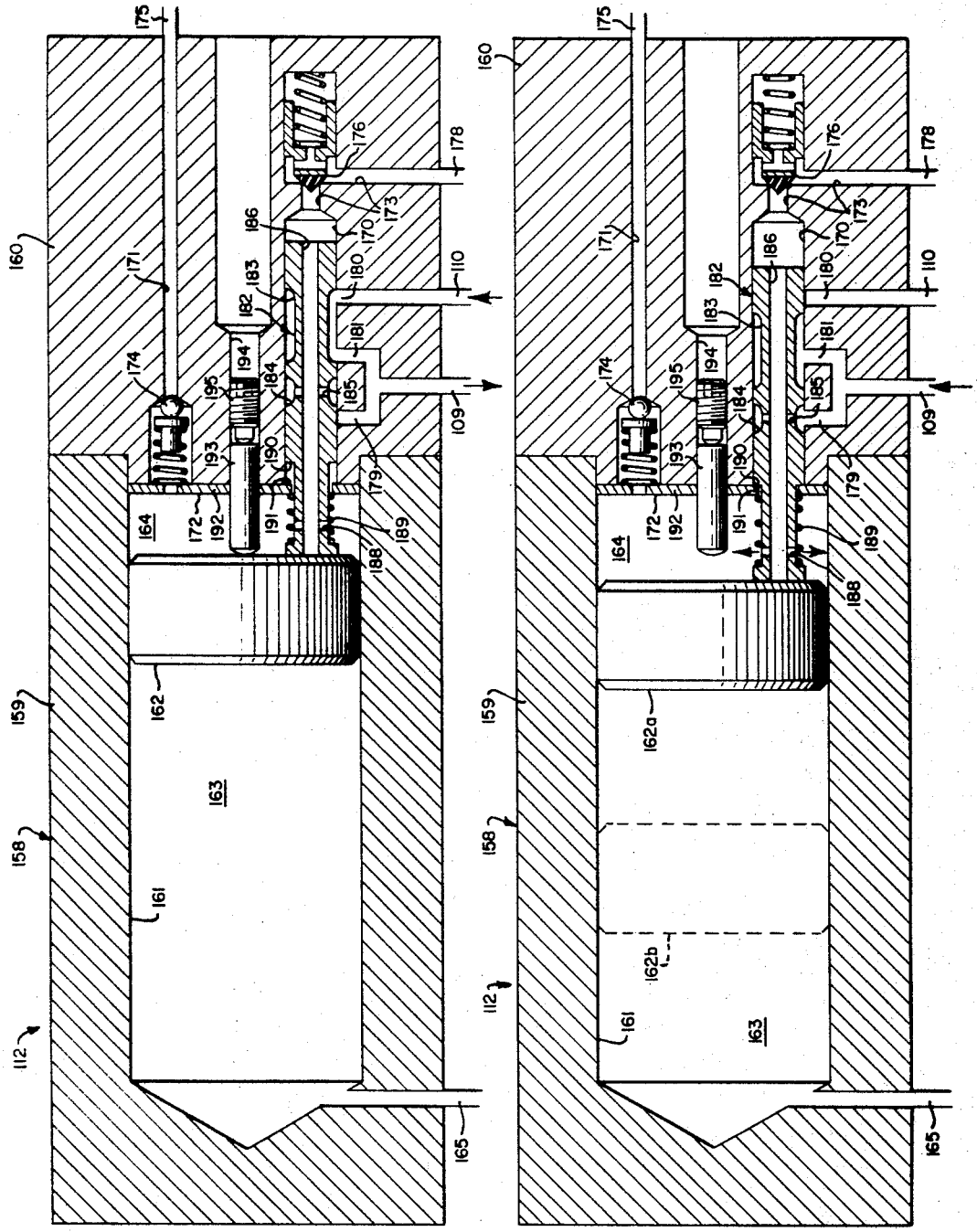

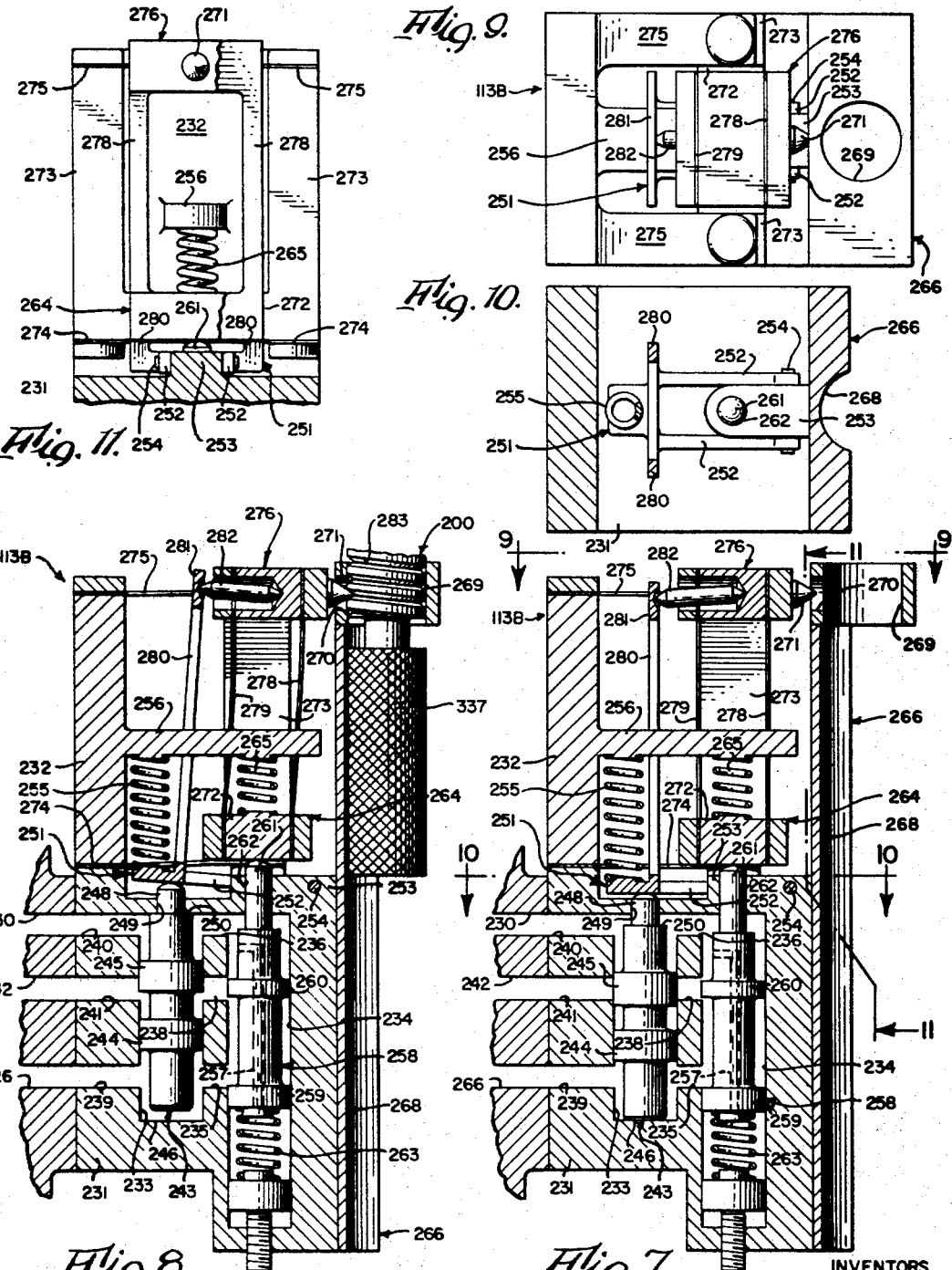

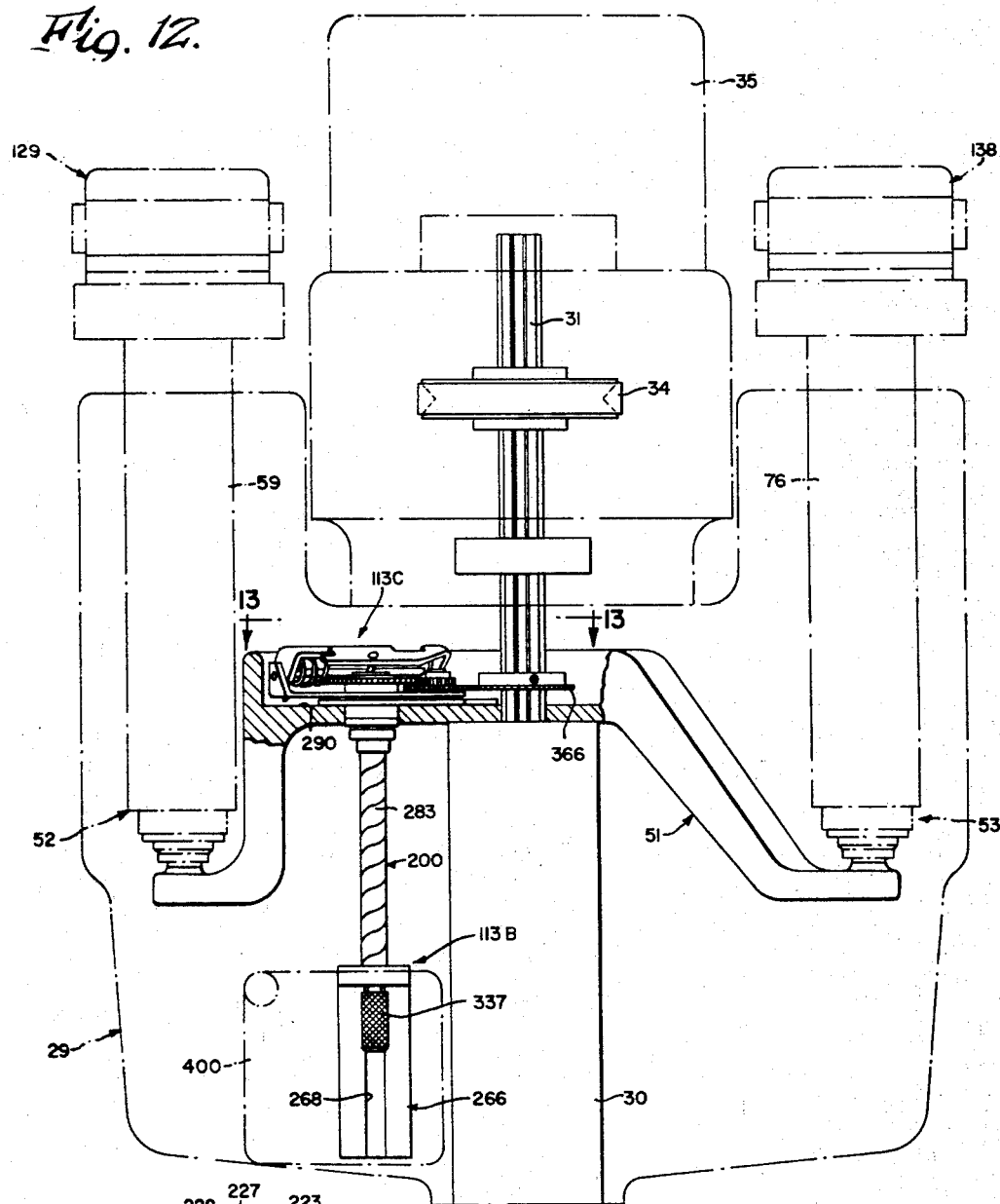
Fig. 12.
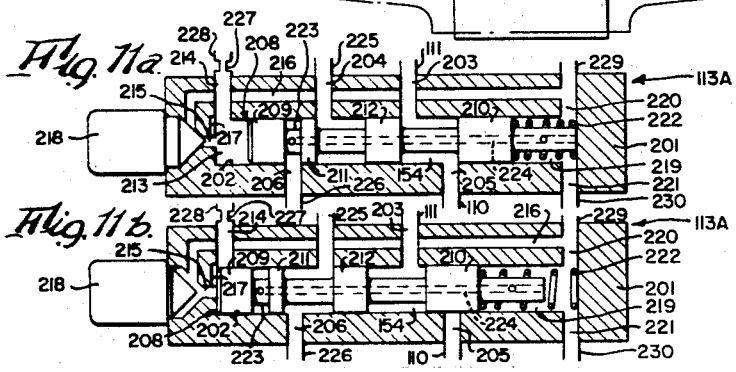
Fig. 11a.
Fig. 11b.

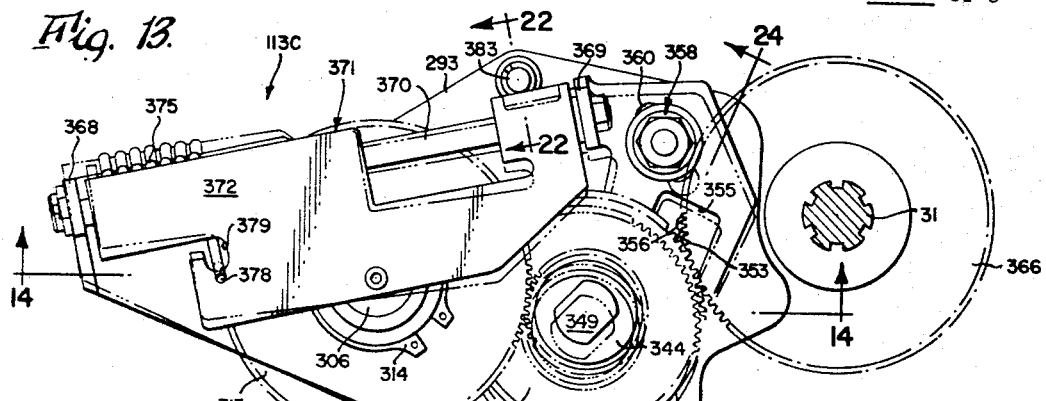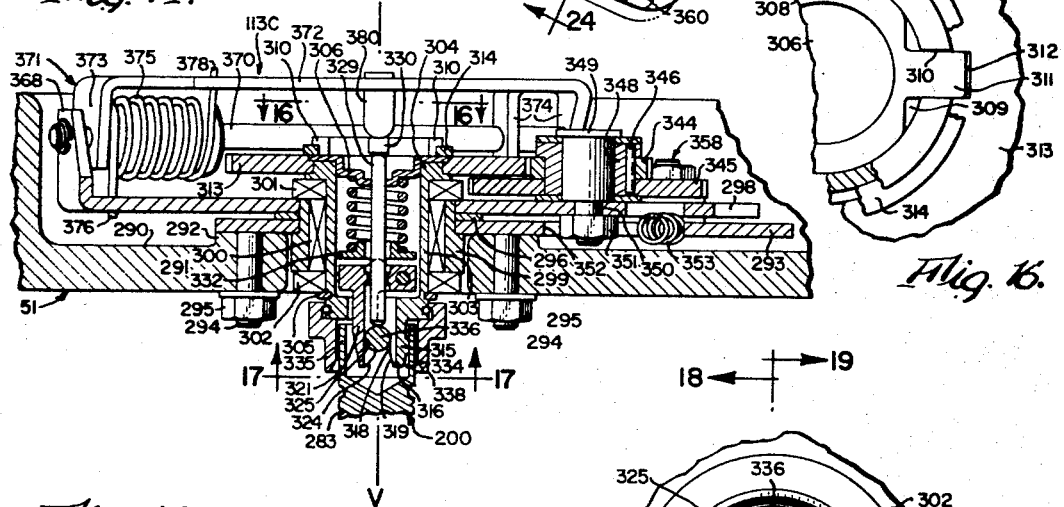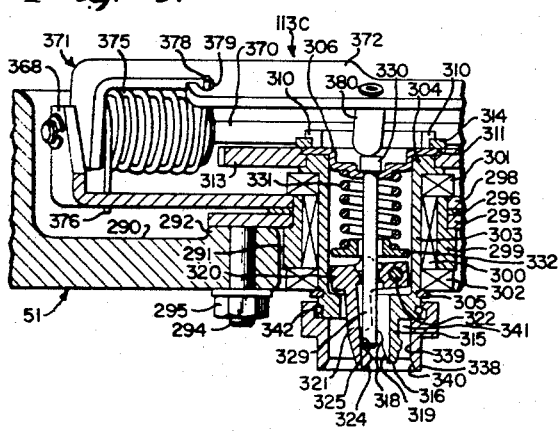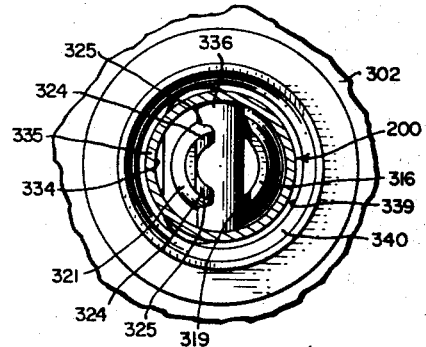

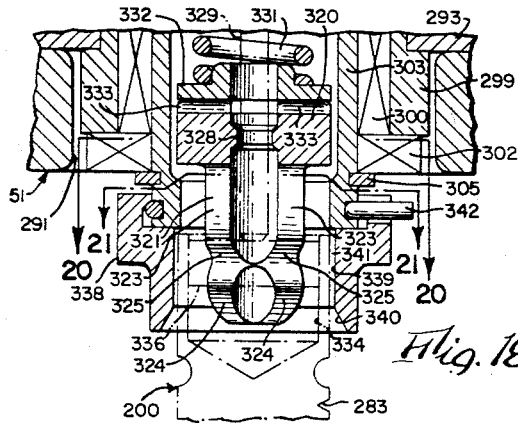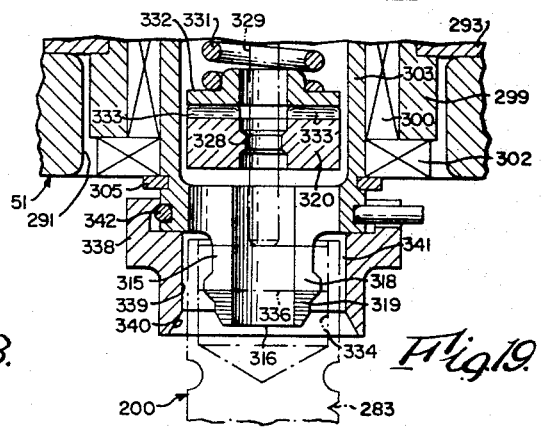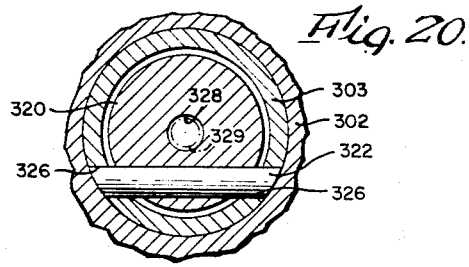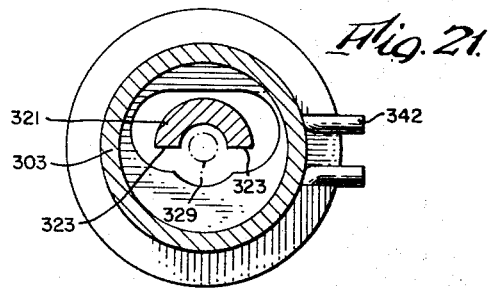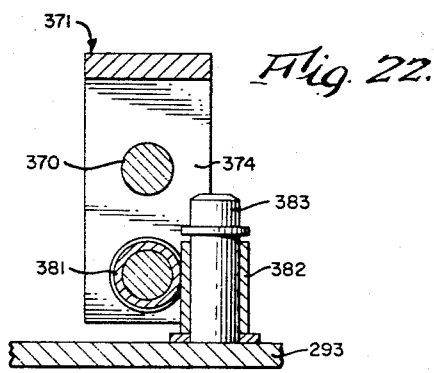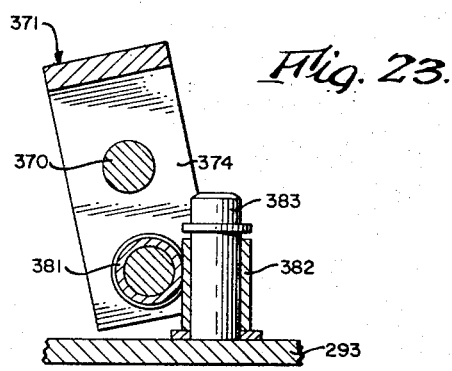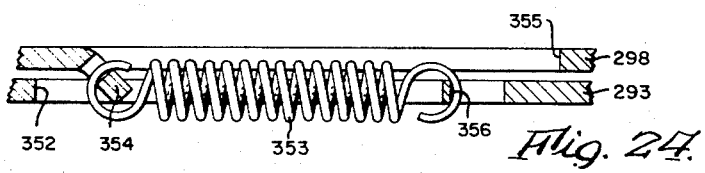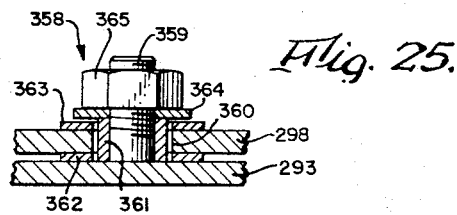
INVENTORS
Robert Z. Hague
John S. Ballard
John J. Lewlew
Franklin G. Miller
BY
Popp and Sommer
ATTORNEYS

# United States Patent Office 3,420,141
Patented Jan. 7, 1969

This invention relates to a positioner for a member such as a machine tool spindle.

The primary object of the present invention is to provide apparatus for hydraulically controlling the movement of a spindle held cutting tool along its axis of travel, commonly referred to as the Z-axis, so that the machining operation intended to be performed by the tool may be carried out in a highly accurate manner and repeatedly, if desired.

Another object is to provide such a Z-axis positioner which relatively rapidly advances the tool from an initial position to a feed point position adjacent the workpiece and also rapidly retracts the tool from such feed point position to such initial position following performance of a machining operation.

Another object is to provide such a Z-axis positioner which advances the tool at a slower but variably controllable feed rate from the feed point position to a final depth point or final position, whereby a drilling, boring, milling or tapping machining operation may be performed.

Another object is to provide such a Z-axis positioner which retracts the cutting tool from the workpiece at a relatively rapid rate during a drilling mode of operation.

Another object is to provide such a Z-axis positioner which cyclically interrupts a drilling operation to retract the cutting tool from the workpiece, rapidly retracting the tool each time to the feed point position in order to clear the hole of chips, and then rapidly readvances the tool toward the workpiece, beginning the feed rate again before contact is made with the workpiece, thereby to provide a peck mode of operation resulting in improved drill life and reduced tool breakage, jamming and scrap losses and is especially suited for small diameter, deep hole drilling.

A further object is to provide such a Z-axis positioner which advances the cutting tool from the feed point position to the final depth position at a selectively variably controllable feed rate and retracts the tool from such final depth position to such feed point position at the same rate, thereby providing a mode of operation suitable for boring holes without leaving tool marks on the workpiece due to retraction of the tool at a rate different from the feed rate.

A further object is to provide such a Z-axis positioner which during a tapping mode of operation advances a cutting tap into the workpiece at a feed rate suitable for the threads being cut by the tap and also retracts the tap at the same rate with the direction of tap rotation reversed so as to unscrew the tap from the threaded hole without damage to the threads, thereby producing clean and accurate threads.

A further aim is to provide such a Z-axis positioner which dwells the cutting tool at the final depth position to allow movement of the workpiece along X- or Y-axes perpendicularly to the Z-axis, thereby enabling a milling operation to be performed.

Another aim is to provide a Z-axis positioner capable of any of the previously mentioned modes of operation in which both the feed point position and final depth point or position are individually selectively variable as to location longitudinally along the Z-axis.

Another aim is to provide a Z-axis numerical control positioner which can be controlled manually or by perforated tape.

Other objects and advantages of the present invention will be apparent from the following detailed description of a preferred embodiment thereof illustrated in the accompanying drawings in which:

FIG. 1 is a front elevational view of a milling machine tool equipped with three-axis numerical control positioners, including the Z-axis positioner embodying the present invention.

FIG. 2 is a perspective schematic view representing the three axes.

FIG. 3 is a simplified schematic layout of the apparatus and associated hydraulic circuitry of the inventive Z-axis positioner forming part of the machine tool equipment illustrated in FIG. 1.

FIG. 5 is an enlarged central longitudinal sectional view, somewhat schematic, of a reciprocating pump shown in FIG. 4 and forming part of the peck device depicted in FIG. 3, and showing elements of the pump in one condition.

FIG. 6 is a sectional view similar to FIG. 5 but showing certain elements of the pump in another condition.

FIG. 7 is an enlarged vertical central sectional view of a tapping valve subassembly shown in FIG. 4 and forming part of the tap device depicted in FIG. 3, and showing elements of the subassembly in one condition.

FIG. 8 is a sectional view similar to FIG. 7 but showing certain elements of the tapping valve subassembly in another condition.

FIG. 9 is a top plan view thereof taken on line 9—9 of FIG. 7.

FIG. 10 is a horizontal sectional view thereof taken on line 10—10 of FIG. 7.

FIG. 11 is a vertical sectional view thereof taken on line 11—11 of FIG. 7.

FIG. 11a is an enlarged vertical central sectional view of a tap mode valve subassembly shown in FIG. 4 and forming part of the tap device depicted in FIG. 3, and showing elements of the subassembly in one condition.

FIG. 11b is a sectional view similar to FIG. 11a but showing certain elements of the tap mode valve subassembly in another condition.

Figure 4:
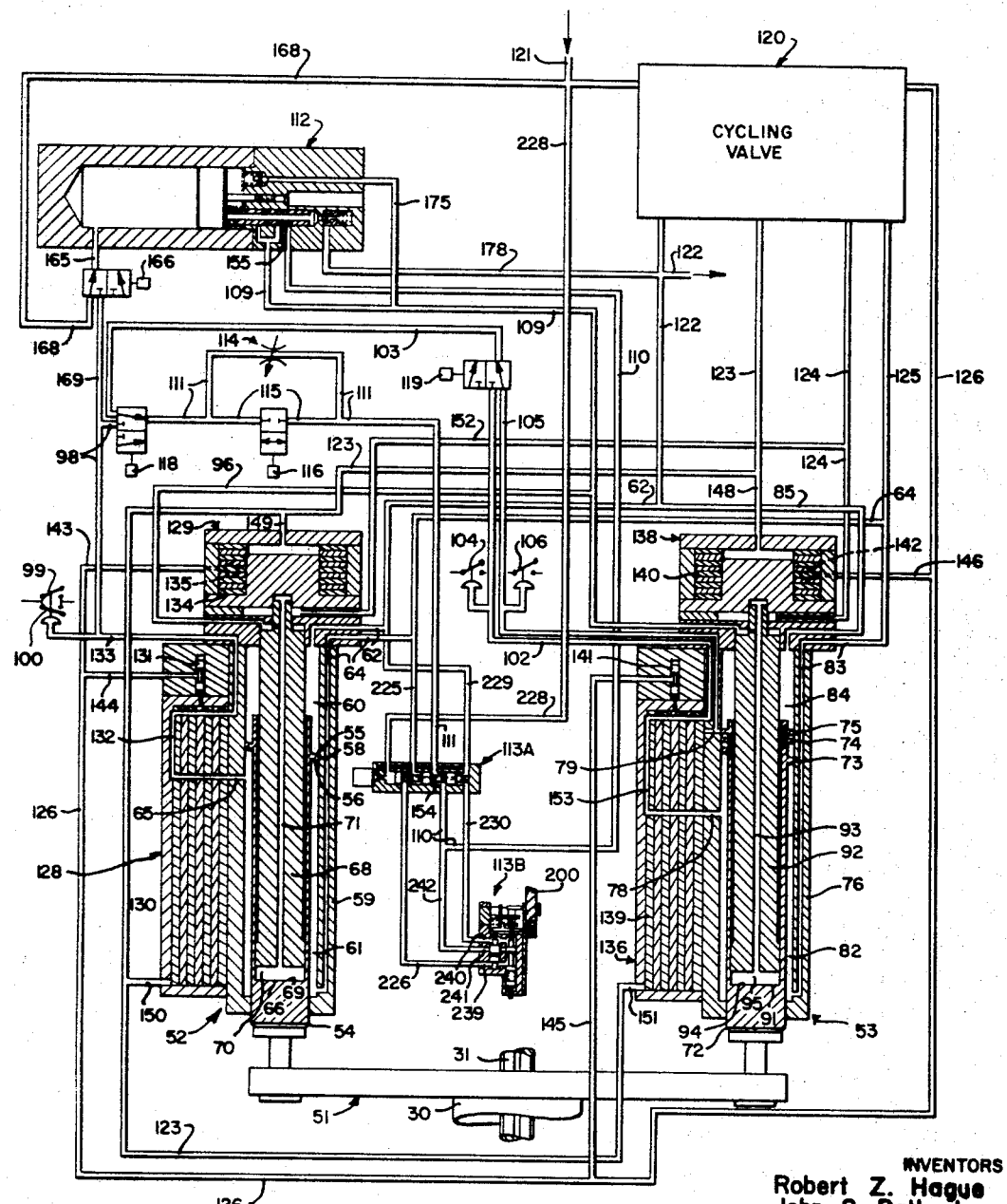
FIG. 4 is another schematic view of the apparatus and hydraulic circuitry, generally similar to that depicted in FIG. 3, but somewhat more detailed.

FIG. 12 is an enlarged front elevational view similar to the upper part of FIG. 1 and showing the housing and other associated parts removed but suggested by broken lines to illustrate the lead screw and its drive mechanism for the aforementioned tapping valve subassembly, such lead screw and drive mechanism forming parts of the tap device depicted in FIG. 3, only a fragment of such lead screw being illustrated in FIG. 4.

FIG. 13 is effectively an enlarged top plan view of the lead screw drive mechanism subassembly shown in FIG. 12, being taken on line 13—13 thereof.

FIG. 14 is a vertical sectional view thereof taken on line 14—14 of FIG. 13 and showing the elements in one condition.

FIG. 15 is a fragmentary sectional view similar to FIG. 14 but showing the elements of the drive mechanism in another condition.

FIG. 16 is a fragmentary enlarged horizontal sectional view thereof taken on line 16—16 of FIG. 14.

FIG. 17 is an enlarged horizontal sectional view thereof taken on line 17—17 of FIG. 14.

FIG. 18 is a fragmentary vertical sectional view thereof taken on line 18—18 of FIG. 17.

FIG. 19 is a fragmentary vertical sectional view thereof taken on line 19—19 of FIG. 17.

FIG. 20 is a horizontal sectional view thereof taken on line 20—20 of FIG. 18.

FIG. 21 is another horizontal sectional view thereof taken on line 21—21 of FIG. 18.

FIG. 22 is a fragmentary enlarged vertical sectional view thereof taken on line 22—22 of FIG. 13 and showing certain elements in one condition.

FIG. 23 is a sectional view similar to FIG. 22 but showing the elements in another condition.

FIG. 24 is a fragmentary enlarged vertical sectional view thereof taken on line 24—24 of FIG. 13.

FIG. 25 is a fragmentary enlarged vertical sectional view thereof taken on line 25—25 of FIG. 13.

(A) GENERAL DESCRIPTION OF MACHINE TOOL; FIGS. 1, 2, 12

The numeral 26 represents generally a machine tool of any suitable type, illustrated specifically as a milling machine, and is shown in FIG. 1 as including a pedestal or vertical column 27 from which a forwardly extending knee 28 extends, a forwardly projecting overhanging head 29 which supports a quill 30 for vertical movement and in turn supporting a relatively rotatable spindle 31 to the lower end of which a cutting tool 32 may be non-rotatably connected as by a conventional chuck 33. This spindle 31 is suitably driven at a selectively variable rotational speed and direction by a drive belt and pulley assembly suggestively indicated at 34 in FIG. 12 which in turn is driven by an electric motor 35.

Machine knee 28 is shown as slidingly supporting a saddle 36 for movement fore-and-aft of the machine or along the axis Y—Y, depicted in FIG. 2. Slidably supported on saddle 36 for horizontal movement in a lateral direction relative thereto or along the axis X—X depicted in FIG. 2, is a table 38 adapted to support a fixture 39 on which a plurality of similar workpieces, typically suggested at 40, may be suitably supported and on which similar machining operations by cutting tool 32 are to be performed. Cutting tool 32 may be of any suitable type. Quill 30 and spindle 31 together are movable vertically up and down along the Z—Z axis depicted in FIG. 2, the quill being suitably guided for such travel by machine head 29 and the spindle being suitably journalled on the quill for rotative movement relative thereto while being constrained to move vertically therewith.

The milling machine illustrated in FIG. 1 is equipped with three axis numerical control positioners of a hydraulic type. To service such positioners there is shown in FIG. 1 adjacent the machine tool a console represented generally by the numeral 41 and a power unit represented generally by the numeral 42 for supplying pressurized air and hydraulic fluid or oil for use by the X-, Y- and Z-axis positioners. Console 41 is shown connected to machine tool 26 by a flexible tubular housing 43 containing pneumatic and hydraulic conduits (not shown) which extend between control elements in console 41 and controlled elements in the components mounted on the machine tool. A similar flexible tubular housing 44 extends between power unit 42 and machine tool 26 for containing pneumatic and hydraulic supply conduits (not shown).

A detailed description of the X- and Y-axis positioners including the essential construction of certain components of console 41 may be found in United States Patents Nos. 3,174,406 and 3,254,572. Suffice to say here that console 41 includes a tape reader mechanism indicated generally at 45 whereby a command tape, perforated according to a binary number system, may be read pneumatically and the commands of the tape translated into intended movements of the X- and Y-axis positioners and hence saddle 36 and table 38 whereby each of workpieces 40 may be moved to a location determined by coordinates in the horizontal X and Y plane.

Instead of controlling such movements from a perforated tape, the commands may be manually set by manipulation of dial members 46 arranged on the control panel of console 41. One set of such dial members is indicated at 48 for control of movement along the X-axis and another set of such members 49 is indicated for control of movement along the Y-axis. The position of a lever 47 controls whether operation is controlled by tape, or whether dial members 48 and 49 are free to be set, or locked for manual operation. By manipulation of a separate dial member 50, a preliminary function may be prescribed so that the various modes of machine operation may be determined. One position of dial member 50 enables dial members 48 and 49 to be utilized to set up numerical control for the Z-axis positioner. A detailed description of the construction and operation of dial members 46 and their associated mechanisms is contained in said United States Patent No. 3,254,572.

The purpose of the present invention is to provide a Z-axis numerical control positioner for hydraulically controlling the vertical movement of spindle 30 and hence cutting tool 32 along the Z-axis. Such Z-axis numerical control positioner will now be described.

(B) DESCRIPTION OF Z-AXIS POSITIONER

(1) *General schematic, FIG. 3*

Before launching into a detailed description of mechanism, it is desired to orient the reader to the general construction of the Z-axis positioner, with its various modes of operation, depicted in the extremely schematic layout of the apparatus and associated hydraulic circuitry shown in FIG. 3. Referring to this figure, the numeral 51 represents a yoke secured to quill 30 in any suitable manner and movable vertically therewith and hence also vertically movable with tool spindle 31. At one end of this yoke, specifically at the left end thereof as shown in FIG. 3, is a feed point actuator assembly represented generally by the numeral 52. At its opposite end, yoke 51 is shown as having associated therewith a final depth actuator assembly represented generally by the numeral 53. While both actuator assemblies bear certain similarities in construction there are differences and hence each will be described separately.

Feed point actuator assembly 52 is shown in FIG. 3 as including a micro-piston 54 suitably connected at its lower end to yoke 51 for vertical movement therewith but being rotatable with respect thereto. A piston head 55 is shown as being on the upper end of piston 54 and has a lower axially facing end face 56 and a helical land surface 58. This land surface 58 is the periphery of piston head 55 and slidably arranged in a stationary cylinder 59. Piston head 55 divides this cylinder into an upper drain chamber 60 and a lower pressure chamber 61. Drain chamber 60 is shown as connected to any suitable fluid return via outlet conduit 62, and pressure chamber 61 is shown as connected to a source of pressurized hydraulic fluid represented by conduit 63 via an inlet branch conduit 64 leading to the lower end of cylinder 59. The side wall of this cylinder is shown as having a port 65 which is characterized as a feed point port.

Micro-piston 54 is provided with an axially extending recess 66 in which a stationary but rotatable secondary piston 68 is arranged. Suitable means such as a pin and slot connection (not shown) cause pistons 54 and 68 to rotate together while permitting relative sliding movement. The lower headed end of this piston 68 opposes the bottom or axially facing end face 69 of recess 66 to provide therebetween an actuating chamber 70. This chamber 70 is serviced via a passage 71 which extends through secondary piston 68. The construction of assembly 52 in detail is like that disclosed for the micrometer valve assemblies in said patents.

Turning now to final depth actuator assembly 53, the same is shown as having a similar micro-piston 72 rotatably connected to yoke 51 but constrained to move vertically therewith. Near its upper end piston 72 is shown as having a lower piston head 73, an intermediate piston head 74 and upper piston head 75. The periphery of these three piston heads 73–75 are concentric and slidably arranged in a stationary cylinder 76 shown as having a lower port 78 characterized as a final depth port, and an upper port 79 characterized as an at-top port. Lower piston head 73, like piston head 55, has an axially facing lower end face 80 and a peripheral helical land surface 81. The portion of cylinder 76 below piston head 73 is a pressure chamber 82 connected to pressure supply 63 via branch line 83 leading to the lower end of the cylinder. The portion of cylinder 76 above upper piston head 75 provides a drain chamber 84 shown as connected to a fluid return via outlet conduit 85.

The annular space 86 between piston heads 74 and 75 is shown as connected to pressure chamber 82 via a passage 88 the upper end of which terminates in the periphery of piston rod 72 between piston heads 74 and 75 and the lower end of which passage terminates in the periphery of this piston rod below piston head 73. In this manner space 86 has the same pressure as pressure chamber 82.

The annular space 89 between piston heads 73 and 74 is shown as communicatively connected to drain chamber 84 via a passage 90 provided in piston rod 72. The lower end of this passage 90 is shown as terminating in the periphery of piston rod 72 between piston heads 73 and 74 and the upper end of this passage is shown as leading to and terminating in the upper end face of upper piston head 75.

Micro-piston 72, like micro-piston 54, has an axially extending recess 91 which receives a longitudinally immovable but rotative secondary piston 92 having a longitudinal passage 93 extending therethrough. Pistons 72 and 92 are constrained to rotate together but can have relative longitudinal movement, the means for this being similar to those previously mentioned in describing pistons 54 and 68. The lower end face of secondary piston rod 92 opposes the upwardly facing bottom 94 of recess 91 to provide therebetween an actuating chamber 95.

It is pointed out that the chambers 70 and 95 jointly provide an actuating chamber having an effective area represented by the sum of the areas of chamber end faces 69 and 94 which is greater than and preferably twice the sum of the areas of lower end faces 56 and 80 of helical piston heads 55 and 73 respectively, for a purpose which will be explained later herein.

Actuating chambers 70 and 95 at all times communicate and are shown as communicatively connected via passages 71 and 93 to the opposite ends of a conduit 96 which may be characterized as a double area conduit.

Feed point port 65 is shown as communicatively connected to an upstream conduit 98 having high pressure null detector means indicated at 99 and low pressure null detector means 100 operatively associated therewith. Final depth actuator port 78 is shown as being communicatively connected to an upstream conduit represented generally by the numeral 101 and this conduit includes a first section 102 and a second section 103. A null detector means 104 is shown as operatively associated with section 102 of upstream conduit 101.

At-top port 79 is shown as communicatively connected to a conduit 105 having operatively associated therewith a null detector means represented generally at 106.

The numeral 108 represents a downstream conduit connected to double area conduit 96 and is shown as including three conduit sections designated 109, 110 and 111. A mechanism designated peck device and represented generally by the numeral 112 is operatively interposed between adjacent ends of downstream conduit sections 109 and 110. The other end of conduit 109 is communicatively connected to double area conduit 96. A mechanism designated tap device and represented generally by the numeral 113 is operatively interposed between adjacent ends of downstream conduit sections 110 and 111. Near its end remote from tap device 113, downstream conduit section 111 is shown as including a variable flow restrictor designated Z and represented by the numeral 114. A bypass conduit 115 at opposite ends is shown as communicatively connected to downstream conduit section 111 on opposite sides of variable restrictor 114.

A rapid feed solenoid valve 116 is operatively interposed in bypass conduit 115 and is illustrated in FIG. 3 in a deenergized condition in which condition bypass conduit 115 is blocked. When solenoid valve 116 moves to the dotted line position 116e, this valve is in its energized condition whereby bypass conduit 115 is unblocked and effective to bypass fluid around variable restrictor 114.

The adjacent ends of conduits 98, 103 and 111 are shown as operatively associated with a feed point solenoid valve 118 which in its deenergized position represented by solid lines in FIG. 3 establishes fluid conducting communication between conduits 103 and 111; whereas when in its energized condition, represented by dotted lines 118e, communication between conduits 103 and 111 is disestablished while simultaneously establishing communication between conduits 98 and 111.

A reverse solenoid valve 119 is shown operatively arranged between the adjacent ends of conduit sections 102 and 103 and conduit 105. As illustrated by full lines in FIG. 3, solenoid valve 119 is shown in its deenergized position in which it establishes communication between conduit 105 and conduit section 103 while blocking any communication with conduit section 102; whereas when in its energized condition, represented by broken lines 119e, the communication between conduit 105 and conduit section 103 is disestablished while simultaneously establishing communication between conduit sections 102 and 103.

Correlating certain elements shown in FIG. 3 with FIG. 1, it will be seen that yoke 51 traverses quill and spindle assembly 30, 31 and at the left end has associated therewith feed point actuator assembly 52 and with its right end final depth actuator assembly 53. Cylinders 59 and 76 of these assemblies are suitably secured to stationary machine head 29.

While helical piston heads 55 and 73 are provided for cooperation with feed point and final depth ports, respectively, severally selectively variable as to location vertically along their respective cylinder walls, as will be considered more fully later herein, the schematic depiction in FIG. 3 considers only a single preselected feed point port 65 and a single preselected final depth port 78. It will be noted that this final depth port 78 is at a lower vertical elevation than feed point port 65, and it will be further noted that at-top port 79 is above feed point port 65 as to vertical elevation.

It will be understood that peck device 112 in one condition intended for FIG. 3 establishes fluid conducting communication between conduit sections 109 and 110 of downstream conduit 108; also, that tap device 113 in one condition intended for FIG. 3 establishes fluid conducting communication between sections 110 and 111 of downstream conduit 108.

In describing the basic operation of the schematic apparatus as shown in FIG. 3, it is first assumed that actuator assemblies 52 and 53 are in their respective positions illustrated in FIG. 3 as to which it will be noted that upper piston head 75 covers or is nulled on at-top port 79. It will also be understood that the various solenoid valves 116, 118 and 119 are initially in their deenergized positions represented by full lines in FIG. 3. It will further be understood that the supply of pressurized fluid to supply conduit 63 is initially blocked by some suitable control (not shown).

Let it now be assumed that this pressure supply to conduit 63 is established and simultaneously solenoid valves 116 and 118 are energized. When this occurs left cylinder pressure chamber 61 is placed in communication with double area conduit 96 and hence actuating chambers 70 and 95 because feed point solenoid valve 116 is in its energized position 118e and rapid feed solenoid valve 116 is in its energized position 116e so that bypass conduit 115 is effective and the upstream end of conduit section 108 communicates with conduit 98. Thus pressurized fluid can flow from supply conduit 63 through branch conduit 64 into chamber 61, through port 65 and thence through connected conduits 98 and 111 via its bypass conduit 115, through tap device 113, through conduit section 110, through peck device 112, and through conduit section 109 to double area conduit 96. Inasmuch as the effective area of actuating chamber end faces 69 and 94 is double that of piston end faces 56 and 80, pressurized fluid will be admitted into chambers 70 and 95 to hydraulically drive spindle 31 downwardly.

This descent of spindle 31 continues until helical land 58 nulls on feed port 65. This produces a drop in pressure in conduit 98 which is sensed by low pressure null detector 100 which is suitably arranged to operate to deenergize solenoid valves 116 and 118 and simultaneously energize reverse solenoid valve 119. The effect of this is to transfer the communication of the actuating chambers 70 and 95 to the cylinder pressure chamber 82 of the final depth actuator assembly. More specifically, conduit sections 102 and 103 of upstream conduit 101 are now in communication with each other because reverse solenoid valve 119 is in its energized position 119e and feed point solenoid valve 118 is in its denergized position 118 as shown by full lines in FIG. 3. However, the deenergization of rapid feed solenoid valve 116 blocks bypass conduit 115 so that fluid is forced to flow through variable restrictor 114. It will thus be seen that fluid now flows into actuating chamber 70 and 95 from pressure supply conduit 63, through branch conduit 83 into right cylinder pressure chamber 82, out final depth port 78 into conduit section 102, through its now connected conduit section 103 and into connected conduit section 111 having restrictor 114 therein, through tap device 113, conduit section 110, through peck device 112 and conduit section 109 into double area conduit 96.

Inasmuch as restrictor 114 has a flow restricting cross sectional area smaller than that provided by bypass conduit 115 when the latter is effective, fluid will flow into actuating chambers 70 and 95 at a slower rate than previously. In other words, descent of spindle 31 from the at-top position to the feed point position will be at a faster rate of speed than descent of the spindle between the feed point position and the final depth position.

The spindle continues to descend until the helical valving land 81 on lower piston head 73 of the final depth actuator assembly 53 nulls on final depth port 78. When this occurs, a drop in pressure is produced in conduit section 102 which is sensed by null detector 104. This null detector is then arranged to become operative to deenergize reverse solenoid valve 119 whereby communication between right cylinder pressure chamber 82 and double area conduit 96 is disestablished while simultaneously establishing communication between conduit 105 and conduit section 103. This conduit section 103 will remain in communication with double area conduit 96.

If the machine tool is in a drill mode of operation, as is assumed to be the case at this moment, when null detector 104 deenergizes reverse solenoid valve 119 it also is operative to energize rapid feed solenoid 116 so as to reestablish the effectiveness of bypass conduit 115. Inasmuch as right cylinder pressure chamber 82 is no longer connected to double area conduit 96, but instead conduit 105 is connected to this double area conduit 96 and this conduit 105 is now in effective communication with cylinder drain chamber 84, and further since there is still present pressurized fluid in cylinder pressure chambers 61 and 82, this pressure becomes effective against piston head end faces 56 and 80. The piston heads are driven upwardly in their respective cylinders so as to raise spindle 31. Such upward movement of the piston heads in their cylinders continues, in a drill mode now being considered because of its simplicity, until upper piston head 75 nulls on at-top port 79. This produces a rise in the pressure of fluid in conduit 105 which is sensed by null detector 106. This null detector generates a signal to block the supply of pressurized fluid to supply conduit 63 by means (not shown) and also is operative to deenergize rapid feed solenoid valve 116 which had been previously energized.

In this manner the apparatus is restored to the condition of its various components illustrated in FIG. 3. That is, the supply of pressurized fluid to 63 has been turned off and all of the solenoid valves 116, 118 and 119 are in their deenergized positions represented by full lines in FIG. 3.

It is to be noted, although discussed in greater detail later herein in connection with other modes of operation, that during the upstroke of spindle 31 left piston head 55 passed feed point 65. This produced an increase in pressure in conduit 98 which is sensed by high pressure null detector 99 and this can be used for control purposes as will later appear.

It will be understood that instead of combining the feed point piston and cylinder means with a first internal actuating chamber, and also combining the final depth point piston and cylinder means with a second internal actuating chamber, a physically separate fluid powered actuator means having a single cylinder and piston could be employed but flow of fluid with respect thereto still controlled by the two piston and cylinder means. It is for compactness of structure that the two piston and cylinder flow control devices are preferably combined with the internal actuator means as shown.

(2) *More detailed schematic, FIG. 4*

FIG. 4 shows a somewhat more detailed schematic layout of the components of the Z-axis positioner and associated hydraulic circuitry shown in FIG. 3. The essential features added by FIG. 4 have to do with illustrating more details of the means for selectively determining the longitudinal location of feed point port 65 along its cylinder of feed point actuator assembly 52 and the longitudinal location of final depth port 78 along its cylinder of final depth actuator assembly 53, of peck device 112, of subassemblies 113a and 113b of tap device 113, of the various solenoid valves 116, 118 and 119, and the various fluid conduits operatively associated with these elements, assemblies and subassemblies.

A new element shown in FIG. 4 but still schematically illustrated, is a cycling valve 120 having a construction known to those skilled in this art and since it forms no part of the present invention is not further described herein. Cycling valve 120 is associated with a main pressure supply conduit 121, a main fluid return conduit 122 and four other conduits including and designated specifically a plate clamp conduit 123, a rotary conduit 124, a servo conduit 125 and a transducer conduit 126. The function of cycling valve 120 is to supply pressurized hydraulic fluid to conduits 123–126 at the appropriate time and in the appropriate sequence.

Feed point actuator assembly 52 includes a linear selector valve assembly 128 and a rotary selector valve assembly 129. Valve assembly 128 includes a series of plates typically designated at 130 and moved by a pneumatic-to-hydraulic transducer 131. The plurality of plates which make up valve assembly 128 severally have holes therein which in various combinations of plate positions effectively locates a single passage through the plates represented by passage 132 which at one end communicatively connects to one of the linearly spaced ports arranged in the wall of cylinder 59, of which port 65 is only one illustrated example, and at its other end communicates with a top-of-tree conduit 133.

In a similar manner but arranged for rotary motion rather than rectilinear motion, rotary selector valve assembly 129 includes a plurality of plates typically represented at 134 and severally moved by hydraulic-to-pneumatic transducers one of which is suggested at 135.

The purpose of rotary selector valve assembly 129 is to rotate secondary piston 68 which has the aforementioned rotative drive coupling to micro-piston 54 but does not move longitudinally so that by rotating secondary piston rod 68 helical piston head 55 can be rotated the desired amount.

If, for example, linear selector valve assembly 128 determines the tens, units and tenths of a dimension, rotary selector valve assembly 129 can determine hundredths and thousandths of the dimension.

The linear selector valve assembly 128 and the rotary selector valve assembly 129 are explained more in detail as to construction and operation in said patents and will not be redescribed here.

Final depth actuator assembly 53 also includes a linear selector valve assembly 136 and a rotary selector valve means 138 which are similar in construction and operation to assemblies 128 and 129, respectively. Thus, assembly 136 has a plurality of slide plates typically shown at 139 and assembly 138 has a plurality of relatively rotatable switch plates one of which is typically indicated at 140. Assembly 136 has a typical pneumatic-to-hydraulic transducer indicated at 141 and a similar transducer for assembly 138 as shown at 142.

Transducer conduit 126 from cycling valve 120 through suitable branches 143, 144, 145 and 146 serves transducers 135, 131, 141 and 142, respectively, with pressurized oil when cycling valve 120 so provides, this pressurized oil being utilized to shift the associated plates of the selector valve assemblies to determine the respective vertical locations desired of the feed point port 65 and final depth port 78. When these selector valve plates have been shifted relative to one another in the desired combination to produce the desired passage therethrough, the respective groups of plates are clamped together hydraulically by pressurized fluid supplied through plate clamp conduit 123. This conduit 123 is shown as having branches at 148, 149, 150 and 151 for servicing the plate clamping means of the various selector valve assemblies 138, 129, 128 and 136, respectively. Cycling valves 120 controls the supply of pressurized fluid to plate clamp conduit 123 at the appropriate time.

Conduit 124 is shown as leading to the rotary actuator of rotary selector valve assembly 138 and via a branch line 152 supplies fluid to the corresponding rotary actuator of rotary selector valve assembly 129. Cycling valve 120 supplies pressurized fluid to rotary conduit 124 at the appropriate time to effect operation of the rotary actuators of assemblies 129 and 138., Servo conduit 125 shown in FIG. 4 corresponds to pressure supply line 63 shown in FIG. 3. Conduit 125 connects via branch conduits 64 and 83 to lower cylinder pressure chambers 61 and 82, respectively. Cycling valve 120 controls the timing of the supply of pressurized fluid to conduit 125.

Upper cylinder drain chambers 60 and 84 are shown as communicating via branch conduits 62 and 85 to main return conduit 122.

Linear selector valve assembly 136 provides a passage therethrough depicted at 153 which at one end communicates with final depth port 78 and at its other end is suitably communicatively connected to conduit section 102 which is here characterized as a top-of-tree conduit having null detector 104 therein which is shown as a pressure sensitive switch.

At-top port 79 provided in the wall of cylinder 76 is shown as communicating with conduit 105 which has null detector 106 arranged therein, this null detector also being shown as a pressure sensitive switch.

The longitudinal passages 71 and 93 through secondary pistons 68 and 72, respectively, have their upper ends suitably communicatively connected to the ends of double area conduit 96.

As explained in connection with FIG. 3, tap device 113 is operatively interposed between conduit sections 110 and 111 and the connection between these conduit sections is indicated by chamber 154 in tap mode valve subassembly 113A. This subassembly, as well as tapping valve subassembly 113B, will be explained as to construction and operation later herein. At the moment it is only desired to point out the similarity in the layout of FIG. 4 to that shown in FIG. 3.

In this same vein, conduit sections 109 and 110 are operatively connected through peck device 112 as indicated by the communicating passages represented at 155 in FIG. 4.

With both peck device 112 and tap device 113 inactivated, as represented both in FIGS. 3 and 4 the similarity between the layouts of the apparatus shown in these figures will become apparent even though considerably more detailed construction is shown in FIG. 4. More specifically, it will be seen from FIG. 4 that the two blocks severally containing an arrow associated with each of solenoid valves 116, 118 and 119 more graphically depict the connections between various fluid conduits in the two positions for each of these solenoid valves. In FIG. 4, these various solenoid valves are illustrated in a deenergized condition as was done in FIG. 3.

The presence of certain other fluid conduits in FIG. 4 not yet identified by reference character but associated with the peck device 112 and the subassemblies of tap device 113 will be noted but these will not be described until a detailed description of these devices is made later herein.

(3) *Peck device, FIGS. 4–6*

As previously noted, peck device 112 when inactivated allows communication between fluid conduits 109 and 110, the former being connected to double area conduit 96 at all times. However, when activated, peck device 112 alternately receives fluid from and supplies fluid to conduit 109 at a faster rate than the feed flow rate through restrictor 114, whereby the tool spindle 31 when between its feed point and final depth positions retracts at a relatively rapid rate from such intermediate position, returning to the feed point position, and then readvances at such relatively rapid rate to a position short of such intermediate position at which it again picks up the predetermined feed rate.

While the peck device 112 may be variously constructed, the same is shown as including a reciprocating feed pump having a body member 158 including a cylinder section 159 and a head section 160 closing the open end of the cylindrical bore 161 provided in cylinder section 159. Slidably arranged in bore 161 is a floating piston 162 which divides the cylinder compartment into a left chamber 163 and a right chamber 164.

As shown in FIG. 4, left cylinder chamber 163 is communicatively connected via conduit 165 to a timed solenoid valve 166. This solenoid valve 166 is shown in FIG. 4 in a deenergized condition whereby conduit 165 is communicatively connected to one end of a branch supply conduit 168 which at its other end is communicatively connected to main pressure supply conduit 121. Solenoid valve 166 is also shown as operatively associated with one end of a drain conduit 169, the other end of this conduit being communicatively connected to top-of-tree conduit 98. It will be seen that when solenoid valve 166 is energized, communication between conduits 165 and 168 will be disestablished, while communication between conduits 165 and 169 will be established.

Head section 160 of body member 158 is shown as formed to provide a valve slide bore 170 and a check valve passage 171 both leading to the inner end 172 of head section 160 and thereby being communicatively connected to right pump chamber 164. This head section 160 is also shown as formed to provide a relief valve passage 173 leading to the end of valve slide bore 170 remote from right pump chamber 164.

Suitable check valve means such as a spring loaded ball 174 is arranged in passage 171 and is operative to allow fluid flow toward right pump chamber 164. The outer end of check valve passage 171 is shown as communicatively connected to conduit section 109 via a branch conduit 175.

Relief valve means of any suitable construction such as a spring loaded conical valve 176 is arranged in passage 173 and is operative to allow fluid flow away from bore 170 and hence away from right pump chamber 164. The outer end of relief valve passage 173 is shown as communicatively connected to main fluid return conduit 122 via a branch conduit 178.

The wall of valve slide bore 170 is shown as having a pair of axially spaced inlet ports 179 and 180 and an intermediate outlet port 181. Left inlet port 179 which is adjacent right pump chamber 164 and outlet port 181 are suitably communicatively connected together and to conduit section 109. The other or right inlet port 180 is suitably communicatively connected to conduit section 110.

The numeral 182 represents generally a valve slide having a right annular groove 183 adapted to establish communication between ports 180 and 181 as shown in FIG. 5. This is the channel 155 shown in FIG. 4. The valve slide 182 also includes a second and left annular groove 184 the base of which is connected by one or more radial holes 185 to a passage 186 which extends longitudinally through the valve slide so that one end thereof is in constant communication with the upstream end of relief valve passage 173 and the other end of longitudinal passage 186 opposes piston 162 and is closed thereby as shown in FIG. 5. However, adjacent this closed end valve slide 182 has radial branch passages 188 whereby longitudinal passage 186 is in constant communication with right pump chamber 164.

When valve slide 182 is in the position shown in FIG. 5, its left annular groove 184 is arranged between ports 179 and 181 and is blocked from communicating with either of these ports. This valve slide 182 is biased to move to the left or toward piston 162 by a helical compression spring 189 operatively interposed between it and body head section 160. Leftward movement of this valve slide 182 under the urging of spring 189 is limited by engagement of an annular shoulder 190 formed on this slide adapted to engage abuttingly an opposing surface 191 on a plate 192 suitably secured to the inner end of head section 160.

An adjustable stop is provided for limiting the proximate position of piston 162 relative to head section plate 192, for a purpose which will be explained later herein. As shown, such adjustable stop means comprises a pin 193 coaxially arranged with piston 162 and projecting from end face 172 toward this piston. This pin 193 is slidably arranged in a bore 194 extending axially through head section 160 and having a threaded intermediate portion on which a backup screw 195 is arranged so that by inserting a tool through the outer end portion of bore 194 and into a suitable socket provided in the end of this screw the same may be turned and thereby its axial position adjusted. Since stop pin 193 is forced toward and into contact with screw 195 when engaged by piston 162 the axial position of this stop pin and hence the maximum rightward position of this piston can be adjusted accordingly.

As shown in FIG. 5, the floating piston 162 is held by pressurized fluid in left pump chamber 163 against stop pin 193 and also engages the end of valve slide 182, holding the latter in a retracted position in which channel 183 establishes communication between ports 180 and 181 but communication between right pump chamber 164 and port 179 is blocked.

However, when solenoid valve 166 is energized, left pump chamber 163 communicates via now connected conduits 165 and 169 with top-of-tree line 98 which at this time will have its associated feed point port 65 located above piston head 55 and hence in communication with cylinder drain chamber 60. This allows pressurized fluid present in conduit 175 to open check valve 174 and flow into right pump chamber 164 thereby displacing piston 162 to the left as depicted in FIG. 6 by both the full line and dotted line positions of this piston indicated at 162a and 162b, respectively. As piston 162 moves away from its stop pin 193, valve slide 182 under the urging of compressed spring 189 remains in contact with the right end face of piston 162, following the same until shoulder 190 engages surface 191 thereby limiting further displacement of this valve slide to the left as shown in FIG. 6. Displacement of the valve slide which thus occurs shifts the grooves 183 and 184 therein such that communication between ports 180 and 181 is broken while communication between channel 184 and port 179 is established. The establishment of such communication places right pump chamber 164 in communication with conduit section 109 leading to double area conduit 96.

It will be noted that when valve slide 182 shifts from its retracted position shown in FIG. 5 to its extended position shown in FIG. 6, conduit section 110 leading from top-of-tree conduit 102 through energized solenoid valve 119, conduit section 103, deenergized solenoid valve 118, conduit section 111 including its restrictor 114 and channel 154, is disconnected from conduit section 109 leading to double area conduit 96 while this latter conduit is placed in communication with right pump chamber 164 through port 179, groove 184 and passages 185, 186 and 188. As soon as this communication is made, and left pump chamber 163 is connected to drain as previously described, pressurized fluid in cylinder pressure chambers 61 and 82 will drive pistons 54 and 72 upwardly. This tends to reduce the volume of actuating chambers 70 and 95 and has the effect of displacing fluid therefrom into double area conduit 96 and hence through now connected conduit section 109, port 179, groove 184 and passages 185, 186 and 188 into right pump chamber 164. This entering fluid will be under sufficient pressure to drive floating piston 162 further to the left as depicted by the dotted line position 162b in FIG. 6.

This condition of leftward movement of piston 162 continues until rising piston head 55 blocks feed point port 65 whereupon low pressure detector switch 100 reactivates solenoid valve 166 thereby reestablishing a communicative connection between conduits 165 and 168 as illustrated in FIG. 4. Fluid under supply pressure is thus readmitted to left pump chamber 163 and since this supply pressure will always be higher than the pressure of fluid in right pump chamber 164 due to the pressure drops which the fluid experienced in reaching this chamber, floating piston 162 will move rightwardly from a position such as 162b back to the full line position 162a shown in FIG. 6 and ultimately back to the position shown in FIG. 5.

When floating piston moves in such rightward direction to reestablish abutting engagement with the end of valve slide 182 it shifts this member to the right. While piston 162 is so moving rightwardly the fluid in right pump chamber 164 is flowing out through still connected passages 188, 186 and 185, groove 184 and port 179 and thence into conduit 109 back to the actuating chambers 70 and 95. This will drive pistons 54 and 76 downwardly and such downward movement will continue until valve slide member 182 has shifted from its extended position shown in FIG. 6 to its retracted position shown in FIG. 5.

There is a time when valve slide 182 will block communication between groove 184 and port 179 and yet pump piston 162 will not have reengaged the opposing end of stop pin 193. What occurs then is that the volume of oil which must still be displaced from right pump chamber 164 to bring piston 162 into contact with stop pin 193 is displaced from the longitudinal passage 186 into the pressure relief passage 173. Relief valve 176 will be unseated by this fluid seeking to be displaced from right pump chamber 164 and such fluid will be vented to the fluid drain until piston 162 reengages stop pin 193 as shown in FIG. 5.

The effect of valve slide 182 returning to its retracted position cutting off communication between left slide groove 184 and port 179 and reestablishing communication between ports 180 and 181 through right slide groove 183, is to return tool spindle 31 to a point slightly above the point at which the next previous retraction stroke began and allowing the predetermined feed rate, determined by the setting of variable restrictor 114, to become effective again before the cutting tool 32 reestablishes contact with the workpiece.

In other words, the axial position of stop pin 193 relative to valve slide 182, when left port 179 no longer communicates with right pump chamber 164, controls the amount of fluid dumped at the end of a readvance stroke of tool spindle 31 toward the workpiece. This is rendered adjustable by changing the axial position of screw 195.

(4) *Tap device; FIGS. 4, 7–25*

The tap device 113 shown in FIG. 3 not only includes the two subassemblies previously mentioned and shown in FIG. 4, one being subassembly 113A which is a tap mode valve mechanism and the other being subassembly 113B which is a tapping valve mechanism, but also includes a third subassembly 113C which is a mechanism for driving a lead screw 200 constituting an element interconnecting subassemblies 113B and 113C as shown in FIG. 12. These various subassemblies will be described separately.

(a) *Tap mode valve subassembly; FIGS. 4, 11a, 11b*

Referring particularly to FIGS. 11a and 11b, tap mode valve subassembly 113A is shown as including a body member 201 interiorly formed to provide a valve slide bore 202 to which axially spaced right and left inlet ports 203 and 204, respectively, lead and also to which a pair of axially spaced right and left outlet ports 205 and 206, respectively, lead. Outlet port 205 is axially offset to the right with respect to inlet port 203 and the other outlet port 206 is axially offset to the left with respect to the other inlet port 204.

Slidably arranged in bore 202 is a valve slide represented generally by the numeral 208 which is shown as including left and right end lobes 209 and 210, respectively, and two left and right intermediate lobes 211 and 212, respectively. A left spool end chamber 213 is shown as having an inlet port 214 and an outlet port 215 blocked from communicating with a return passage 216 by a solenoid valve 218 when the same is in a deenergized condition as shown in FIG. 11a. Communication between ports 214 and 215 is always maintained by a groove 217 in the end wall of left spool end chamber 213. A right spool end chamber 219 is shown as having a first port 220 and a second diametrically alined port 221. Passage 216 is shown as communicating at its end remote from solenoid valve 218 with port 220. A helical compression spring 222 is shown as arranged in right spool end chamber 219 so as to urge valve slide 208 to the left.

Valve slide 208 has its lobes 210 and 212 axially spaced from each other such that when this slide is urged to its extreme rightward position, determined by the slide engaging the right end wall of its bore 202 as depicted in FIG. 11a, the annular space 154 between these lobes, also referred to in FIG. 4, establishes communication between right inlet port 203 and right outlet port 205. Inlet port 203 is communicatively connected to conduit section 111 and outlet port 205 is communicatively connected to conduit section 110, as shown in FIG. 4.

Referring again to FIG. 11a, the axial spacing between intermediate lobes 211 and 212 is such that lobe 211 blocks communication between left inlet port 204 and left outlet port 206. This outlet port 206 is shown in FIG. 11a as communicating with annular groove 223 in valve slide 208 the base of which communicates with one end of a passage 224 extending longitudinally to the extreme right end of this valve slide. Passage 224 also has a lateral branch terminating in the periphery of the reduced right end portion of valve slide 208. As shown in FIG. 4, left inlet port 204 is communicatively connected to one end of a branch conduit 225 the other end of which is communicatively connected to conduit 64 which supplies pressurized fluid to cylinder pressure chamber 61 of the feed point actuator assembly 52. Left outlet port 206 is shown in FIG. 4 as connected to one end of a conduit 226 which leads to subassembly 113B for a purpose hereinafter explained.

Pressure port 214 is shown in FIG. 4 as communicatively connected to one end of a branch supply conduit 228 the other end of which is communicatively connected to main pressure supply conduit 121. This conduit 228 has a flow restrictor 227 therein. Return port 220 is shown in FIG. 4 as communicatively connected at one end of a branch return conduit 229 the other end of which is communicatively connected to return conduit 62 which services drain chamber 60 of feed point actuator assembly 52. Port 221 is shown as communicatively connected to one end of a conduit 230 which leads to subassembly 113B for a purpose hereinafter explained.

Referring to FIG. 11a, it will be seen that with solenoid valve 218 deenergized and with pressurized fluid in end chamber 213, valve slide 208 is driven to and held in its extreme right position as illustrated in this figure and in which position communication between conduit sections 110 and 111 is established by space 154 but is blocked between conduits 225 and 226. However, when solenoid valve 218 is energized, its valve closure will unseat and establish communication between outlet port 215 and return passage 216 whereby compression spring 222 will expand to shift valve slide 208 in a leftward direction until it bottoms out on the end wall of left spool chamber 213, as depicted in FIG. 11b. In this position, right end lobe 210 covers right outlet port 215 so as to block communication between conduit sections 110 and 111. At this same time, left intermediate lobe 211 has shifted to the left of left outlet port 206 so that the annular space 217 between intermediate lobes 211 and 212 now establishes communication between these ports and hence between conduits 225 and 226. Upstream restrictor 227 and now partially covered downstream groove 217 act as orifices to control the flow of fluid to return passage 216 at this time.

It will thus be seen that energization of solenoid valve 218 causes tap mode valve assembly 113A to operate so as to block further communication between conduit sections 110 and 111 and simultaneously establish communication between conduits 225 and 226. Deenergization of the solenoid valve 218 will allow pressure to build up on the left end face of valve slide 208 to shift to the right and thereby reconnect conduit sections 110 and 111 and at the same time disconnect conduits 225 and 226.

(b) *Tapping valve subassembly; FIGS. 4, 7–11*

Tapping valve subassembly 113B is shown as including a lower body member 231 and an upper body member 232 suitably secured thereto. Lower body member 231 is shown as internally formed to provide a rear shift spool compartment 233 and a front pilot valve spool compartment 234, both compartments being cylindrical and vertically elongated. These compartments are shown as connected by common pressure, return and intermediate actuating ports axially spaced along the common wall between these compartments, the pressure port being the lower port and indicated at 235, the return port being the upper port and indicated at 236, and the actuating port being the intermediate port and being indicated at 238. Body member 231 is also formed to provide service pressure, return and intermediate actuating ports leading to shift spool compartment 233, the service pressure port being the lower port and indicated at 239 and in horizontal alinement with common pressure port 235, the service return port being the upper port and indicated at 240 and in horizontal alinement with common return port 236, and the service intermediate actuating port being the intermediate port and indicated at 241 and in horizontal alinement with common actuating port 238.

Referring to FIG. 4, service pressure port 239 is shown as communicatively connected to the end of conduit 226 which is remote from the tap mode valve subassembly 113A; service return port 240 is shown as communicatively connected to the end of conduit 230 which is also remote from tap mode valve subassembly 113A; and service actuating port 241 is shown as communicatively connected to one end of a branch conduit 242 the other end of which is communicatively connected to conduit section 110.

Slidably arranged in rear compartment 233 for vertical movement therein is a shift spool indicated generally at 243. This spool includes a lower lobe or piston head 244 arranged at all times above pressure ports 239 and 235 so that these ports constantly communicate with each other, and an upper lobe 245 arranged at all times below communicating return ports 240 and 236 so that they constantly communicate with each other but this lobe 245 is adapted to block communication between intermediate actuating ports 241 and 238, this blocking position being illustrated in FIG. 7. In this blocking position shift spool 243 is in its lowermost position determined by its lower end engages a stop surface 246 which is the lower end wall of compartment 233. At its upper end, shift spool 243 is shown as having an axially extending stem 248 of reduced diameter which projects through a hole 249 in the upper end wall of compartment 233. At the base of stem 248 is an annular shoulder 250 adapted to engage the upper end wall of compartment 233, as depicted in FIG. 8.

Shift spool 243 is urged downwardly by engagement with a downwardly biased lever member 251. This lever member is shown as including a pair of generally horizontal arms 252 which straddle an upwardly extending hinge block 253 integral with lower body member 231 and the front ends of these arms are hinged on a horizontal hinge pin 254 which has an axis extending transversely of and forwardly offset from rear shift spool compartment 233. Lever member 251 is biased downwardly into engagement with shift spool 243 by a helical compression spring 255 the lower end of which engages this member near its rear end and the upper end of which bears against the bottom surface of a forwardly extending rigid arm 256 formed as an integral part of upper body member 232.

Slidably arranged in front compartment 234 for vertical movement therein is a pilot valve spool indicated generally at 258. This valve spool is shown as including a lower lobe 259 adjacent common pressure port 235 on the lower side thereof and an upper lobe 260 adjacent common actuating port 238. This lobe 260 is underlapped with respect to its port 238. The valve spool also includes an upwardly extending stem 261 of reduced diameter which projects through a hole 262 provided in the upper end wall of compartment 234. Arranged below pilot valve spool 258 in the lower end portion of its compartment 234 is an adjustable helical compression spring 263. The spring operates constantly to urge valve spool 258 to move upwardly. This valve spool is also shown as having a vent passage 257 which establishes communication at all times between the chamber for spring 263 and return port 236.

Arranged over and in engagement with the upper end of valve stem 261 is a follower member indicated generally at 264 which is urged downwardly into firm and constant engagement with this valve stem by an overhead helical compression spring 265 interposed between this member 264 and overhanging rigid arm 256.

Suitably secured to the front face of lower body member 231, which is to the right as viewed in FIGS. 7 and 8, is a lead screw guide member indicated generally at 266. This guide member is shown as having a vertically extending and forwardly opening semi-cylindrical groove 268 which extends for the height of both body members 231 and 232 and at its upper end also includes a guide ring 269 adapted to guidingly receive the periphery of lead screw 200. On the rear side of this ring 269 adjacent upper body member 232 a hole 270 is provided. Through this hole a stylus 271 is adapted to move from a retracted position as depicted in FIG. 7, to a projected position in which the point of stylus 271 projects generally radially beyond the internal wall of guide ring 269, as depicted in FIG. 8.

The means for supporting stylus 271 for movement into and out of hole 270 will now be described.

Follower 264 is a U-shaped member including a bottom horizontal cross bar 272 which engages directly spool stem 261, and a pair of upstanding arms 273 extending upwardly from opposite ends of cross bar 272. Suitably secured to the bottom surface of cross bar 272 are the front ends of a pair of laterally spaced lower leaf springs 274 which are generally horizontally arranged. The rear ends of these leaf springs 274 are suitably clamped between body members 231 and 232. Arranged above leaf springs 274 is another pair of similar upper leaf springs 275 which at their front ends are suitably secured to the upper ends of upstanding arms 273 and at their rear ends are suitably secured to the upper end of upper body member 232. In this manner, leaf springs 274 and 275 are cantilever-mounted at their rear ends and their front ends which are secured to follower member 264 are free to move vertically up and down with this member by flexing these springs.

Stylus 271 is shown as carried on the front of a holder member indicated generally at 276 which is arranged generally above cross bar 272 and intermediate the upper ends of upstanding arms 273 for movement fore and aft relative to these arms. Holder member 276 is supported in this elevated position by a pair of front leaf springs 278 arranged generally vertically and a pair of similar rear leaf springs 279. The upper ends of these springs 278 and 279 are suitably clamped to holder member 276 and the lower ends of these springs are suitably clamped to cross bar 272 and thereby secured to U-shaped follower member 264.

Lever member 251 near its rear end is shown as having a pair of laterally spaced upstanding spring arms 280 secured thereto with their upper ends connected by a horizontal cross bar 281 disposed generally at the rear of and spaced from stylus holder member 276. Operatively interposed between cross bar 281 of lever member 251 and stylus holder member 276 is a pivot member 282 which is shown as having pointed ends engaging conical seats to provide frictionless pivotal connections between it and members 251 and 276.

Vertical leaf springs 278 and 279 can flex by arcuate movement of stylus holder member 276 in a fore and aft direction but at the same time these springs act as ties or struts to transmit vertical forces between holder member 276 and follower member 264. During such arcuate movement pivot member 282 pivots on its pointed ends.

Lead screw 200 is shown as having a helical groove 283 adapted to receive the pointed end of stylus 271 when this stylus has been projected toward the lead screw, as depicted in FIG. 8.

When the elements of tapping valve subassembly 113B are in the condition shown in FIG. 7 which is the condition when tap mode solenoid valve 218 is deenergized and communication between conduits 225 and 226 is blocked, it will be seen that pressurized fluid is not supplied to service pressure port 239 but service return port 240 is connected at all times to fluid drain through interconnected conduits 230 and 229. With no pressure under the lower end face of lower lobe or piston head 244 of shift spool 243, spring 255 urges this spool to its maximum downward position as depicted in FIG. 7. In this position, upper lobe 245 blocks communication between actuating ports 241 and 238 as also illustrated in FIG. 7. This is to block branch conduit 242 which is in constant communication with conduit 110 as shown in FIG. 4.

However, when tap mode solenoid valve 218 is energized so as to communicatively disconnect conduit sections 110 and 111 and simultaneously connect conduits 225 and 226, pressurized fluid is supplied to service pressure port 239 and thereby also against the bottom end face of lower lobe or piston head 244. This is effective to overcome spring 255 and shift spool 243 is lifted to its maximum upward position depicted in FIG. 8. In so moving, upper lobe 245 unblocks the communicative connection between actuating ports 241 and 238 as also illustrated in FIG. 8.

At the same time, the upward displacement of shift spool 243 pivots lever member 251 in a clockwise direction about the axis of its pivot pin 254, as viewed in FIGS. 7 and 8, thereby pushing spring mounted cross bar 281 against pivot member 282 and this pivot member in turn pushing against stylus holder member 276. Vertical leaf springs 278 and 279 flex and permit this movement to allow stylus 271 to project through hole 270 and to be received in groove 283 of lead screw 200, all as depicted in FIG. 7. If a portion of the peripheral surface of lead screw is first contacted by the stylus point, rotation of the lead screw as hereinafter explained will soon present a portion of groove 283 so that the stylus can snap thereinto. Spring arms 280 limit the loading on stylus 271.

With pressurized fluid so supplied to connected pressure ports 239 and 235 fluid flows past underlapped lobe 260 and into port 238 with some of the fluid flowing toward conduit 242 and some flowing past this lobe toward return port 236. The effect of this is to establish an intermediate pressure and flow in conduit 242 which is connected to conduit 110.

If the interconnection between stylus 271 and lead screw 200 tends to lift the stylus, it will be seen that spring 263 under pilot valve spool 258 will raise this spool to maintain engagement between spool stem 262 and follower cross bar 272. Spring 265 above this cross bar exerts a downward force thereon also to maintain interengagement at all times between pilot valve spool 258 and follower member 264.

If, as just assumed, lead screw 200 tends to lift stylus 271 the upward movement of follower member 264 is permitted by flexing of horizontal springs 274 and 275. Such assumed upward movement of follower member 264 allows pilot valve spool 258 to move upwardly in its compartment 234 thereby establishing more communication between common intermediate actuating port 238 and service actuating port 241, as depicted in FIG. 8. This allows more pressurized fluid to flow from compartment 234 between lobes 259 and 260 into intermediate port 238, thence through compartment 233 intermediate lobes 244 and 245 to port 241, and thence through conduit 242 to conduit section 110.

If, on the other hand, the interconnection between stylus 271 and lead screw 200 is such as to push follower member 264 downwardly and hence pilot valve spool 258 downwardly, the extent of communication between common intermediate actuating port 238 and service actuating port 241 will be reduced, thereby reducing the flow of fluid to conduit 242.

It will therefore be seen that pilot valve spool 258 controls the flow of fluid to double area conduit 96 to control the descent of tool spindle 31. If such descent tends to be too slow, pilot valve spool 258 will tend to be raised allowing greater flow, whereas if such descent tends to be too rapid, this pilot valve spool will move downwardly to reduce the rate of fluid flow to the double area actuating chambers 70 and 95. In other words, pilot valve spool 258 controls the flow of fluid with respect to double area actuating chambers 70 and 95 in response to the locus of stylus 271 and its engagement with lead screw 200 and seeks to maintain this locus stationary.

(c) *Lead screw drive subassembly, FIGS. 12–25*

Subassembly 113C is provided for rotating lead screw 200 at a rotational speed related to that of tool spindle 31. Such drive means includes rotatable means for coupling to lead screw 200 and contrained to move vertically with tool spindle 31, and also includes gear train means for driving the coupling means from the spindle, such gear trains means being operative when the lead screw is connected to the coupling means and being inoperative when the same are disconnected.

Referring to FIG. 12, the upper surface of the central portion of yoke 51 is shown as being formed to provide a recess 290 in the floor of which to one side of the spindle axis is a vertical hole 291 surrounded at its upper end by an annular boss 292. Resting on this boss is a fixed horizontal plate 293 secured in any suitable manner to yoke 51 as by several studs 294 depending from this plate and extending through holes provided in the yoke and severally having nuts 295 arranged on their lower threaded ends. Arranged above fixed plate 293 in slightly spaced relation thereto as provided by a washer 296 is a movable plate member 298. Both plates have registered vertical holes therethrough concentric with yoke hole 291 and arranged in these plate holes is the upper reduced end portion of a tubular spacer 299. This spacer surrounds an anti-friction bearing 300 and engages an upper anti-friction thrust bearing 301 and a lower anti-friction thrust bearing 302.

Arranged on this bearing assembly for rotation about vertical axis V—V is a tubular shaft member 303 which has a head portion 304 at its upper end overhanging and engaging upper bearing 301 and adjacent its lower end carries an axially loading type snap ring 305 in a groove provided therein immediately below and engaging with lower bearing 302. This puts a preload on thrust bearings 301 and 302.

Supported on the head portion 304 of tubular member 303 is a cup-shaped member or cap 306 having an outturned flange 308 which rests on an internal upwardly facing annular shoulder 309 formed on head portion 304. This head portion has a pair of diametrically opposite radial slots 310 which receive severally lugs 311 which project radially outwardly from cap flange 308. The outer ends of these lugs 311 are received severally in slots 312, best shown in FIG. 16, formed in the hub of a driven gear 313 arranged concetric to axis V—V and also supported on an upwardly facing shoulder formed on shaft head portion 304. This head portion has an external groove which receives a snap retaining ring 314 to hold cap 306 and gear 313 in position on tubular shaft member 303. With such an interconnection it will be seen that rotation of gear 313 will drivingly rotate tubular shaft member 303.

The coupling means for removably connecting lead screw 200 to tubular shaft member 303 will now be described. This member 303 is shown as having an integral depending arcuate portion 315. As best shown in FIGS. 17 and 19 this arcuate portion 315 which serves as a latch body or reference member has a lower axially facing end face 316 and circumferentially facing edge surface 318 including cam portions 319 which lie in a plane inclining away from end face 316 upwardly and inwardly toward axis V—V. A hinged latch member 320 has a depending arcuate latch portion 321 which is generally complementary to latch reference member 315 and movable relative thereto. Movable members 320 is hinged for pivotal movement about a horizontal pivot pin 322 arranged transverse to and offset from vertical axis V—V.

The latch portion 321 of this hinged member 320 is shown as having circumferentially facing edge surfaces 323 which oppose and are spaced from circumferential edge surfaces 318 on latch body 315. These surfaces 323 are shown as including lower or outer inclined cam portions 324 and inner transversely alined latch notch portions 325. Cam surfaces 324 lie in a plane which inclines inwardly and upwardly in a direction toward vertical axis V—V to provide jointly with cam surfaces 319 on the lower end of latch body 315, a converging entrance to circumferential spaces which exist between opposing edge surfaces 318 and 323.

Hinged latch member 320 is arranged internally of tubular member 303 and pivots on the ends of a hinge pin 322 arranged in alined holes 326 in member 303 as shown in FIG. 20.

This hinged latch member 320 is also shown as having a generally vertical hole 328 as best shown in FIGS. 18 and 19 through which a push rod 329 extends. The upper portion of this push rod extends through a central hole provided in the base of cap 306 and the upper extremity of this rod has an enlarged head 330 which is adapted to engage the upper surface of this cap and thereby limit downward movement of this rod. The lower end portion of push rod 329 extends through hole 328 and into the center space which exists between opposing members 315 and 321.

Member 320 is urged to move its arcuate latch portion 321 toward the fixed reference latch body 315, or in a counter-clockwise direction about the axis of hinge pin 322 as viewed in FIGS. 14 and 15, by a helical compression spring 331. This spring 331 surrounds push rod 329 and the upper end of this spring bears against the bottom surface of cap 306 and the lower end of this spring bears against a washer like spring seat member 332. The bottom face of this member 332 engages the crests of upwardly rounded fulcrum lugs 333 on the upper surface of a hinged member 320 and arranged on diametrically opposite sides of push rod 329.

Referring to FIGS. 14 and 17, the upper end of lead screw 200 is shown as having a coaxial cylindrical recess 334 providing an annular wall 335 which carries the ends of a diametrical horizontal pin 336 extending transversely of this recess. This cross pin 336 is adapted to be pushed upwardly into engagement with cam surfaces 319 and 324 thereby enlarging the space between arcuate members 315 and 321 against the urging of spring 331 so that continued upward movement of lead screw 200 will permit spring 331 to expand and swing latch member 321 toward latch body 315 and allow notches 325 which are generally semi-circular to embrace a peripheral portion of pin 336 and thereby retain the inner locked connection of lead screw 200 to the coupling means. The lead screw is held against axial or angular movement relative to members 315 and 321.

Referring to FIGS. 8 and 12, the lower end of lead screw 200 has a knurled portion 337 which enables the lead screw to be grasped manually, inserted upwardly through guide ring 269 and present cross pin 336 to the entrance between members 315 and 321. In this connection, it will be noted that when the lead screw is disconnected from the coupling means, and latch member 321 assumes a canted position with respect to reference member 315, as depicted in FIG. 15, the lower end face of latch member 321 is arranged below lower end face 316 on reference member 315.

In order to facilitate insertion of members 315 and 321 into the recess 334 on lead screw 200, these members are surrounded by a guide ring 338. This guide ring surrounds the reference and latch members in spaced relation thereto and has an internal cylindrical guide surface 339 which at its lower end is preferably outwardly flared, as indicated at 340, and extends to a level axially of tubular shaft member 303 at least as far as the lower end face of latch member 315 when in the canted position shown in FIG. 15. It will be seen that by inserting lead screw wall 335 into annular space 341 this wall will engage guide surface 339 before cross pin 336 engages cam surfaces 324.

Guide ring 338 may be secured rotatably or non-rotatably to tubular shaft member 303 in any suitable fashion. As shown in FIGS. 14 and 15, the upper portion of guide ring 338 embraces the lower end portion of the enlarged section of tubular shaft member 203 and a snap ring 342 cooperates with retaining surfaces formed both on guide ring 338 and tubular member 303.

It will also be seen that when lead screw cross pin 336 is inserted between members 315 and 321 it engages the lower end of push rod 329 to raise the same from the disengage position shown in FIG. 15 to the engage position shown in FIG. 24, for a purpose which will appear later herein.

Returning to the gear train mechanism, an idler gear assembly indicated generally at 343 is operatively associated with driven gear 313 and is movable along an arcuate path concentric with vertical axis V—V. For this purpose, idler gear assembly 343 is supported on movable plate 298 which pivots or swings about vertical axis V—V. As shown in FIG. 14, this idler gear assembly includes an upper small gear 344 meshing with driven gear 313 and suitably fast to a lower and larger gear 345. A key 346 is shown as so fastening the gears 344 and 345 together. These gears have a bushing 348 which surrounds a headed pintle 349 carried by swing plate 298. For this latter purpose, pintle 349 has a depending shank 350 which extends through a hole in plate 298 and a nut 351 is arranged on the lower threaded end of this shank.

In order to accommodate the nut 351, lower fixed plate 293 is cut out as indicated at 352. Also arranged in this cut-out 352 is a tension spring 353, best shown in FIG. 24, which at one end is hooked through a downturned eye lug 354 formed at one end of a cut-out indicated at 355 in swing plate 298 which cut-out also partially receives spring 353, and the other end of this spring is hooked to an eye lug 356 provided at one end of cut-out 352 in fixed plate 293. Viewed in plan, as by referring to FIG. 13, spring 353 urges swing plate 298 to move in a counterclockwise direction about the vertical axis V—V which is the axis of rotation of driven gear 313.

Such swing movement is guided and the general parallelism of plates 293 and 298 is maintained by a pair of pin and slot means 358. The details of such means are shown in FIG. 25 and comprise an upstanding stud 359 carried by fixed lower plate 293 and extending upwardly through a slot 360 formed in swing plate 298 so as to be concentric with vertical axis V—V. Surrounding stud 359 is a spacer 361 the upper ends of which in turn are surrounded by upper and lower spacer washers 362 and 363, respectively, arranged above and below swing plate 298. Arranged on the upper end of tubular spacer 361 is a nut washer 364 and a nut 365 is arranged on the upper threaded extremity of stud 359.

When lead screw 200 is connected to the coupling means as shown in FIG. 14, swing plate 298 is in the gear engage position depicted by full lines in FIG. 13 wherein lower idler gear 345 meshes with a drive gear 366 non-rotatably fast to tool spindle 31. However, when the lead screw is disconnected from the coupling means, as depicted in FIG. 15, swing plate 298 is caused to move to the dotted line position represented in FIG. 13 which is a gear disengage position. In this manner the drive gear mechanism will not be operative to rotate the coupling means unless lead screw 200 is connected to the coupling means.

The means for permitting movement of swing plate 298 between its gear disengage and gear engage positions will now be described. Swing plate 298 is shown as having two spaced upturned trunnion arms 368 and 369. These arms 368 journal an elongated hinge pin 370. Rotatably mounted on this hinge pin 370 is a bell-crank lever member represented generally by the numeral 371. This lever member 371 is shown as being in the form of a plate 372 having at one end a downturned trunnion arm 373 and at its other end a pair of downturned trunnion arms 374. Hinge pin 370 extends through alined openings provided in trunnion arms 373 and 374. In order to bias rotation of lever member 371 in a given direction about the axis of hinge pin 370, a wind-up spring 375 surrounds a portion of hinge pin 370 adjacent trunnion arm 373 and has one end portion 376 received in a hole provided in swing plate 298 and its other end portion 378 received in a generally L-shaped slot 379 provided in plate 372.

This plate portion 372 of lever 371 overhangs the upper end of push rod 329 and is shown as carrying a depending rigid pin 380 the lower end of which is spherically convex and bears against the upper end surface of push rod head 330, as shown in FIG. 14.

The free ends of downturned trunnion arms 374 of lever member 371 carry a horizontal arranged roller 381. As best shown in FIGS. 22 and 23, this roller engages a rotatable vertically disposed sleeve 382 surrounding an upstanding post 383 carried by fixed plate 293. Post 383 is in the nature of a stud upstanding from fixed plate 293 and at its lower end is suitably secured thereto.

The bias of wind-up spring 375 is such that it urges pin 380 of lever member 371 downwardly against push rod 329, the ultimate position being determined by push rod head 330 engaging the upper surface of cap 306 as depicted in FIG. 15. When lever member 371 is in this position, it also assumes the position relative to post 383 depicted in FIG. 22. In effect the lateral or offset position of the axis of hinge pin 370 relative to post 383 is the criterion in determining the positions of plates 293 and 298 relative to each other. However, when push rod 329 is elevated to the position shown in FIG. 14, it pivots bell-crank lever member 371 about the axis of hinge pin 370 in a clockwise direction, as viewed in FIGS. 22 and 23, so as to shift the axis of hinge pin 370 in a rightward direction horizontally closer to fixed post 383. The effect of this is to allow tension spring 353 to swing plate 298 and rotate the same in a counterclockwise direction, as viewed in FIG. 13, to move this plate from the gear disengage position represented by dotted lines in this FIG. 13 to the gear engage position represented by full lines in this figure. In this gear engage position, gears 345 and 366 mesh with a preload maintained by tension spring 353 to eliminate backlash, the initial position of fixed plate 293 being suitably adjusted relative to yoke 51 to permit of this preloading.

Preferably the gear train mechanism is designed so that lead screw 200 rotates at half the speed of tool spindle 31.

(C) MODES OF OPERATION (1) *How determined*

Preliminary function dial member 50 on console 41 contains a series of numbered positions certain of which severally represent the various possible modes of operation which include a drill mode, a bore mode, a mill mode, a peck mode and a tap mode. This dial member 50 also includes a numbered station which may be called Z-axis which enables manipulation of dial members 48 to control the setting of the feed point, i.e., the location of feed point port 65, and manipulation of dial members 49 to determine the location of final depth, i.e. the location of final depth port 78. Of course there are other levers on console 41 such as lever 47 for determining whether the machine will be in a dial, lock or set position, as explained generally in said Patent No. 3,198,084. If the machine tool is in a tap mode of operation, the commands for the various X-, Y- and Z-axis positioners will be determined by perforations in a tap read by reader 45.

(2) *Drill mode*

Let is be assumed that either a tape or manually controlled command, it matters not, calls for a drill mode of operation for the Z-axis positioner. In general, the tool spindle 31 will start at an initial at-top position, descend at a relatively fast rate to the preselected feed point position, thence continue its downstroke further at a slower feed rate predetermined by adjustment of variable restrictor 114 until the preselected final depth position is reached, followed by a rapid upstroke to the initial at-top position. If desired, a dwell can be arranged at the end of the downstroke before the upstroke commences. This sequence of movement is determined by the appropriate energization and deenergization of solenoid valves 116, 118 and 119 in part controlled by null detectors 100, 104 and 106.

More specifically, the drill mode cycle of operation begins with solenoid valves 116, 118 and 119 in a deenergized condition and with actuator assemblies 52 and 53 in their resepective at-top positions. The cycle commences by energizing solenoid valves 116 and 118 and supplying pressurized fluid to inlet conduit 63 (FIG. 3) or servo conduit 125 through cycling valve 120 (FIG. 4). As previously explained, pressurized fluid is admitted at a relatively high rate of flow to actuator chambers 70 and 95 until piston head 55 nulls on feed point port 65. This is detected by low pressure null detector 100 which deenergizes solenoid valves 116 and 118 and also energizes solenoid valve 119 to associate actuator chambers 70 and 95 with final depth actuator assembly 53 and to cause fluid to flow through variable restrictor 114. When piston head 73 nulls on final depth port 78, this is detected by null detector 104 which deenergizes solenoid valve 119 and energizes solenoid valve 116. Tool spindle 31 begins its upstroke until piston head 75 nulls on at-top port 79 which is sensed by null detector 106 which operates to deenergize solenoid valves 116 and 118. Cycling valve 120 cuts off the supply of pressurized fluid to servo conduit 125, the equivalent of conduit 63 in FIG. 3, and the cycle is complete.

As shown in FIG. 1, variable restrictor 114 is controlled by a knob labeled Z.

(3) *Bore mode*

The cycle of bore mode operation is identical to that of the previously described drill mode of operation except that with the bore mode solenoid valve 116 is not energized at the end of the downstroke determined by piston head 73 nulling on final depth port 78. The effect of this is to cause the upstroke to begin and continue at the same rate as the feed rate but only with movement in the reverse direction. Specifically fluid is forced to flow through variable restrictor 114. The upstroke continues at this reduced or feed rate until piston head 55 nulls on feed point port 65 which produces an increase in pressure in this port sensed by high pressure detector 99. This detector then operates to energize solenoid valve 116 causing variable restrictor 114 to be bypassed and the balance of the upstroke from the feed point to the at-top position continues at a more rapid rate. At the latter position, null detector operates to deenergize solenoid valves 116 and 118.

(4) *Mill mode*

The mill mode cycle of operation is identical to that previously described for the drill mode cycle except that tool spindle 31 remains or dwells at the final depth position at the end of the downstroke. Thus when piston head 73 nulls on final depth port 78, null detector 104 is programmed so as not to deenergize reverse solenoid valve 119. This keeps actuator assemblies 52 and 53 hydraulically locked in the final depth position. With the cutting tool retained in this final depth position, the X- and Y-axis positioners may be actuated to position the workpiece 40 in the X and Y plane to effect a milling operation. When completed, reverse solenoid valve 119 is deenergized and rapid feed solenoid 116 is energized so that tool spindle 31 is retracted rapidly in the same manner as prescribed for the drill mode.

(5) Peck mode

The peck mode cycle of operation involves actuation of peck device 112 when tool spindle has descended to at least the feed point position determined by piston head 55 nulling on feed point port 65. A timer (not shown) then periodically energizes solenoid valve 166. Typically the cycle of operation is three seconds and is preferably variable selectively. When this solenoid valve 166 is energized the reciprocating pump of peck device 112 becomes operative to alternately disconnect conduit sections 109 and 110 and connect right pump chamber 164 with conduit section 109, all as previously described in connection with FIGS. 5 and 6.

In this manner cutting tool 32 which will be specifically a drill bit will retract each time to the feed point position in order to clear chips following which it will readvance toward the workpiece, picking up the feed rate before actually contacting the bottom of the hole being drilled.

This alternate advance and retraction during the peck mode of operation continues until the final depth position is reached, following which tool spindle 31 will retract to its at-top position determined by piston 75 nulling on at-top port 79, in the same manner as described for the upstroke during the drill mode cycle of operation.

(6) Tap mode

The tap mode cycle of operation, like that for the peck mode, is effective only after tool spindle 31 has reached the feed point in its downstroke.

At the beginning of the tap mode cycle of operation solenoid valves 116 and 118 are energized to cause spindle 131 to descend at a rapid rate to the feed point. At the feed point determined by piston head 55 nulling on feed point port 65, this being sensed by null detector 100, solenoid valve 118 is deenergized and solenoid valves 119 and 218 are simultaneously energized. At this time the spindle motor is preferably started to rotate the tap, which is now the specific cutting tool 32, in the appropriate direction. Energization of solenoid valve 218 places the supply of pressurized fluid to actuating chambers 70 and 95 under control of tapping valve subassembly 113B via actuating branch conduit 242, the tapping valve assembly 113B being supplied with pressurized fluid for this purpose. When the tool spindle 31 reaches the final depth position, determined by piston head 73 nulling on final depth port 78, this is sensed by null detector 104 which is programmed to deenergize solenoid valve 119 while keeping solenoid valve 218 energized. The effect of keeping solenoid valve 218 energized is to allow hydraulic fluid to be displaced from actuating chambers 70 and 95 under control of tapping valve subassembly 113B. Null detector 104 is also programmed to control suitable means (not shown) for reversing the direction of rotation of tool spindle 31 and hence the tap.

Upstroke of the tool spindle proceeds at a rate determined by interengagement of stylus 271 with groove 283 of lead screw 200 although this lead screw is now rotating in the opposite direction. This situation continues until piston head 55 nulls on feed point port 65 which is detected by high pressure null detector 99 which then operates to deenergize solenoid valve 218 of the tap mode valve subassembly 113A. The effect of this is to allow further upstroke movement at a rapid rate until piston head 75 nulls on at-top port 79. This is sensed by null detector 106 which operates to deenergize solenoid valves 116 and 119 and also causes the cycling valve 120 to cut off the supply of pressurized fluid to conduit 105. In this manner the tap mode cycle of operation is completed.

A lead screw 200 having a helical groove 283 therein is selected with the appropriate lead corresponding to that for the tap being used for the particular cutting tool 32 carried by spindle 31. In this connection, it will be noted from a reference to FIG. 12 that the housing for the Z-axis positioner or machine head 29 includes a hinged door indicated at 400 which may be swung away to expose the front of tapping valve subassembly 113B and in particular to enable a lead screw to be inserted upwardly through guide ring 269 for connection of the upper end of this lead screw to the coupling means of the drive mechanism subassembly 113C.

Also, as was previously pointed out, the gear train mechanism driving lead screw 200 from spindle drive gear 366 is such preferably to reduce the rotational speed of the lead screw to half that of this drive gear. This necessitates the lead of the helical groove 283 on lead screw to be twice that of the actual cutting tap tool 32 inasmuch as this tool is rotating at twice the speed of the lead screw 200.

From the foregoing, it will be seen that the embodiment of the present invention illustrated and described achieves the aforestated objects. Inasmuch as modifications and changes in the construction of the various components may occur to those skilled in the art without departing from the spirit of the present invention, the preferred embodiment shown and described is illustrative and not limitative of the present invention, the scope of which is to be measured by the appended claims.

What is claimed is:

1. In a positioner for a member such as a machine tool spindle movable in one direction from an initial position through a feed point position to a final position, the improvement therein which comprises fluid powered actuator means for moving said member in said direction, cylinder means, piston means associated with said cylinder means to provide pressure and drain chambers on opposite sides of said piston means, means for providing a feed point port in said cylinder means on the pressure side of said piston means communicatively connected to said actuator means so as to move said member from said initial position toward said feed point position at one rate, and means for provding a final position port in said cylinder means on the pressure side of said piston means communicatively connected to said actuator means when said piston means moves over said feed point port so as to move said member from said feed point position toward said final position at another rate.

2. In a positioner for a member such as a machine tool spindle movable in one direction from an initial position through a feed point position to a final position, the improvement therein which comprises fluid powered actuator means for moving said member in said direction, first piston and cylinder means including a first cylinder wall having a feed point port therein and a first piston head connected to said member and slidable on said first cylinder wall and dividing such cylinder into pressure and drain chambers and arranged to move over said feed point port, second piston and cylinder means including a second cylinder wall having a final position port therein and a second piston head connected to said member and slidable on said second cylinder wall and dividing such cylinder into pressure and drain chambers and arranged to move over said final position port, means for supplying pressurized fluid to said pressure chambers, means for removing fluid from said drain chambers, and means for communicatively connecting said ports to said actuator means so as to move said member from said initial position toward said feed point position at one rate and to move said member from said feed point position toward said final position at another rate.

3. The improvement according to claim 2 wherein each of said ports is selectively variable as to location longitudinally along its respective cylinder wall, whereby both said feed point position and said final position may be varied.

4. The improvement according to claim 3 wherein the port-to-actuator connecting means includes a first fluid flow path from said feed point port having a larger minimum flow restricting cross sectional area than that of an alternate fluid flow path from said final position port, whereby said member moves at a faster rate from said initial position toward said feed point position than from the latter toward said final position.

5. The improvement according to claim 4 wherein said cross sectional area of said first fluid flow path is fixed and that of said alternate flow path is selectively variable, whereby said member has a selectively variable feed rate in moving from said feed point position toward said final position.

6. The improvement according to claim 3 wherein the port-to-actuator connecting means includes first upstream conduit means communicatively connected to said feed point port and including first null detector means, second upstream conduit means communicatively connected to said final position port, downstream conduit means communicatively connected to said actuator means for supplying fluid thereto, and first means responsive to said first null detector means for switching communication from between said first upstream and downstream conduit means to between said second upstream and downstream conduit means when said first piston head nulls on said feed point port.

7. The improvement according to claim 6 wherein said downstream conduit means includes selectively variable restrictor means, bypass conduit means communicatively connected to said downstream conduit means on opposite sides of said restrictor means, and said first responsive means are also operative to block said bypass conduit means when said first piston head nulls on said feed point port.

8. The improvement according to claim 7 wherein said first responsive means includes rapid feed solenoid valve means arranged in said bypass conduit means, feed point solenoid valve means arranged at the upstream end of said downstream conduit means, and said first null detector means includes first pressure sensitive switch means arranged in said first upstream conduit means and operatively associated with both said solenoid valve means.

9. The improvement according to claim 2 wherein said actuator means has a greater effective fluid drive area than the end face areas of said piston heads on the pressure chamber side thereof, and means for communicatively connecting said actuator drive area to one of said drain chambers when said second piston arrives at said final position port, whereby pressurized fluid acting against said piston end face areas operates to drive said member in a reverse direction opposite to said one direction.

10. The improvement according to claim 6 wherein said actuator means has a greater effective fluid drive area than the end face areas of said piston heads on the pressure chamber side thereof, one of said piston and cylinder means has an initial position port in its cylinder wall on the drain chamber side of its first-mentioned port, reverse conduit means communicatively connected to said initial position port, said second upstream conduit means includes second null detector means, and second means responsive to said second null detector means for switching communication from between said second upstream and downstream conduit means to between said reverse conduit means and downstream conduit means when said second piston head nulls on said final position port.

11. The improvement according to claim 10 wherein said second responsive means includes reverse solenoid valve means, and said second null detector means includes second pressure sensitive switch means arranged in said second upstream conduit means and operatively associated with said reverse solenoid valve means.

12. The improvement according to claim 10 wherein said one of said piston and cylinder means is said second piston and cylinder means and the piston thereof includes an initial position piston head on the drain chamber side of said second piston head and also includes an intermediate piston head arranged between said second and initial position piston heads, means communicatively connecting the space between said initial position and intermediate piston heads to the aforementioned pressure chamber of said second piston and cylinder means, means communicatively connecting the space between said second and intermediate piston heads to the aforementioned drain chamber of said second piston and cylinder means, and said reverse conduit means includes third null detector means which are operated when said initial position piston head nulls on said initial position port.

13. The improvement according to claim 12 wherein said downstream conduit means includes selectively variable restrictor means and feed point solenoid valve means arranged at the upstream end of said downstream conduit means, bypass conduit means communicatively connected to said downstream conduit means on opposite sides of said restrictor means, rapid feed solenoid valve means arranged in said bypass conduit means, said first and third null detector means severally including respectively first and third pressure sensitive switch means, said first and second switch means severally being arranged to sense a decrease in pressure, said third switch means being arranged to sense an increase in pressure, said first switch means being arranged to operate said feed point, rapid feed and reverse solenoid valve means when said first piston head moving in said one direction nulls on said feed point port, said second switch means being arranged to operate said reverse and rapid feed solenoid valve means when said final position piston head nulls on said final position port, and said third switch means being arranged to operate said feed point and reverse solenoid valve means when said initial position piston head moving in said reverse direction nulls on said initial position port, whereby a drill mode cycle is provided during which said member advances at a relatively rapid rate from said initial position to said feed point position, further advances at a slower feed rate from said feed point position to said final position, and retracts at such relatively rapid rate from said final position to said initial position.

14. The improvement according to claim 13 wherein said first upstream conduit means also has operatively associated therewith fourth null detector means including fourth pressure sensitive switch means arranged to sense an increase in pressure, said second switch means being arranged to operate only said reverse solenoid valve means and not said rapid feed solenoid valve means when said second piston head nulls on said final position port, and said fourth switch means being arranged to operate said rapid feed solenoid valve means when said first piston head moving in said reverse direction nulls on said feed point port, whereby a bore mode cycle is provided during which said member advances at a relatively rapid rate from said initial position to said feed point position, further advances at a slower feed rate from said feed point position to said final position, retracts at such feed rate from said final position to said feed position, and further retracts at such relatively rapid rate from said feed point position to said initial position.

15. The improvement according to claim 13 wherein said second switch means are not effective to move said member in said reverse direction immediately when said final position piston head nulls on said final position port, whereby a milling mode is provided during which said member advances at a relatively rapid rate from said initial position to said feed point position, further advances at a slower feed rate from said feed point position to said final position, and dwells at said final position.

16. The improvement according to claim 2 wherein said actuator means has a greater effective fluid drive area than the end face areas of said piston heads on the pressure chamber side thereof, and the port-to-actuator connecting means includes conduit means communicatively connected to said actuator means and peck device means associated with said conduit means and arranged when operative to alternately receive fluid from and supply fluid to said actuator means at a flow rate higher than that which obtains when said peck device means are inoperative and said member is moving toward said final position at said another rate.

17. The improvement according to claim 16 wherein said peck device means includes reciprocating feed pump means which are operative when said member is between its said feed point position and said final position to retract said member from a position intermediate such positions to said feed point position and then to readvance said member to a position short of said intermediate position.

18. The improvement according to claim 17 wherein said conduit means includes first and second conduit sections, and said pump means includes means providing a piston compartment, a valve slide bore, a check valve passage and a relief valve passage, both said bore and check valve passage leading to one end of said compartment, said relief valve passage leading to the end of said bore remote from said compartment one end, a floating piston reciprocable in said compartment and dividing the same into first and second pump chambers, means for supplying pressurized fluid to said first pump chamber which is on the side of said piston opposite from said compartment one end and including means for alternately removing fluid from said first pump chamber, a valve slide slidably arranged in said bore and projecting into said second pump chamber and abuttingly engaged by said floating piston to hold said valve slide in a retracted position, means biasing said valve slide toward said floating piston, means limiting the following travel of said valve slide toward said floating piston when said floating piston moves away from said valve slide to hold said valve slide in an extended position, said valve slide having a longitudinal passage one end of which is constantly communicatively connected to said second chamber and the other end of which is constantly communicatively connected to said relief valve passage and also having separated longitudinal and transverse channels, said transverse channel being communicatively connected to said longitudinal passage, the wall of said valve slide bore having first and second axially spaced inlet ports and an intermediate outlet port, said longitudinal channel communicatively connecting said first inlet and outlet ports when said valve slide is in said retracted position but not when in said extended position, said transverse channel communicatively connecting said second inlet port to said longitudinal passage when said valve slide is in said extended position but not when in said retracted position, means communicatively connecting said first inlet port to said first conduit section, means communicatively connecting said second inlet and outlet port to said second conduit section, means communicatively connecting said check valve passage to said second conduit section, check valve means arranged in said check valve passage and operative to allow fluid flow toward said second pump chamber, and relief valve means arranged in said relief valve passage and operative to allow fluid flow away from said second pump chamber.

19. The improvement according to claim 18 wherein said means for alternately removing fluid from said first pump chamber comprises selectively operated timed solenoid valve means.

20. The improvement according to claim 18 wherein adjustable stop means for said pump piston are provided to vary the retracted position of said valve slide and thereby the amount of fluid dumped through said relief valve means.

21. The improvement according to claim 2 wherein the port-to-actuator connecting means includes conduit means communicatively connected to said actuator means and tapping device means associated with said conduit means for supplying fluid to said actuator means at a predetermined controlled flow rate.

22. The improvement according to claim 21 wherein said tapping device means comprises selectively actuatable tap mode valve means, a lead screw having a helical groove, drive means for rotating said lead screw at a rotational speed related to that of said spindle, and tapping valve means including flow control valve means and means operatively engageable with said groove in response to actuation of said tap mode valve means for moving said flow control valve means in response to the locus of such engagement.

23. The improvement according to claim 22 wherein said conduit means includes upstream and downstream conduit sections, said tap mode valve means includes means providing first and second inlet ports and first and second outlet ports, a tap mode valve slide movable relative to said ports and in a first position permitting communication between said first inlet and outlet ports while blocking communication between said second inlet and outlet ports and movable to a second position permitting communication between said second inlet and outlet ports while blocking communication between said first inlet and outlet ports and selectively actuatable means for moving said tap mode valve slide from said first position to said position, said first inlet port being communicatively connected to said upstream conduit section, said first outlet port being communicatively connected to said downstream conduit section, means for supplying pressurized fluid to said second inlet port, said flow control means including a supply port and an actuating port, supply conduit means communicatively connecting said second outlet port to said supply port, and actuating conduit means communicatively connecting said actuating port to said downstream conduit section.

24. The improvement according to claim 22 wherein said tapping valve means includes means providing a shift spool compartment, a pilot valve spool compartment, common pressure, return and intermediate actuating ports between said compartment and service pressure, return and intermediate actuating ports for said shift spool compartment, a shift spool slidable in said shift spool compartment and having a lobe and piston head, said shift spool being arranged in a disable position in which said lobe blocks communication between said actuating ports but being shiftable by pressurized fluid admitted to said service pressure port and effective against said piston head to an enable position in which said lobe permits communication between said actuating ports, said shift spool permitting at all times communication between said pressure ports and between said return ports, a pilot valve spool slidable in said pilot valve spool compartment and having a lobe operatively associated with said common intermediate actuating port, a stylus in a retracted position out of engagement with said lead screw but movable generally radially of said lead screw to a projected position in which said stylus is received in said groove thereof, and means supporting said stylus for movement from said retracted position to said projected position in response to movement of said shift spool from its said disable position to said enable position and also supporting said stylus for movement longitudinally of said lead screw in response to longitudinal movement of said pilot valve spool.

25. The improvement according to claim 24 wherein said supporting means comprises a follower member engaging said pilot valve spool cantilevered leaf spring means arranged to extend generally transversely of the longitudinal axis of said pilot valve spool and at one end connected to said follower member, a holder member holding said stylus, strut leaf spring means arranged to extend generally transversely of said cantilevered leaf spring means and at one end being connected to said holder member and at the other end being connected to said follower member, and means for pushing said holder member toward said lead screw against the urging of said strut leaf spring means when said shift spool is moved from its said disable position to said enable position.

26. The improvement according to claim 25 wherein said pushing means includes a lever member fulcrumed for movement about an axis extending generally transversely of the longitudinal axis of said shift spool and engaging said shift spool at a location offset from such fulcrum axis, spring means urging said lever member into engagement with said shift spool, and a pivot member interposed between said lever member and said stylus holder member and having a pivotal engagement with each.

27. The improvement according to claim 22 wherein said drive means includes rotatable means for coupling to said lead screw and constrained to move with said spindle in said direction, and gear train means for driving said coupling means from said spindle, said gear train means being arranged to be operative when said lead screw is connected to said coupling means and being arranged to be inoperative when the same are disconnected.

28. The improvement according to claim 27 wherein said lead screw at one end has a coaxial cylindrical recess providing an annular wall which carries a pin extending transversely of said recess, and said coupling means are rotatable about a first axis and comprise an arcuate reference member having an axially facing end face and circumferentially facing edge surfaces including cam portions which lie in a first plane inclining away from said axial end face in a direction toward said first axis, an arcuate latch member generally complementary to said reference member and movable relative thereto and hinged for pivotal movement about a second axis transverse to and offset from said first axis and having circumferentially facing edge surfaces which oppose and are spaced from those of said reference member and include outer cam portions and inner transversely alined latch notch portions, said outer cam portions lying in a second plane which inclines inwardly in a direction toward said first axis to provide a converging entrance to the aforementioned circumferential spaces, and yielding means urging said latch member to move toward said reference member to reduce said circumferential spaces, said outer cam portions extending axially outwardly beyond said end face when said latch member is adjacent said reference member, whereby said lead screw can be interlocked to said coupling means by forcing said pin against said outer cam portions to move said latch member away from said reference member and enlarge said circumferential spaces and to direct said pin into said circumferential spaces until retentively received in said notches.

29. The improvement according to claim 28 wherein a guide ring surrounds said reference and latch members in spaced relation thereto and has an internal guide surface which at one end extends axially at least as far as said latch member, said wall of said lead screw being engageable with said guide surface before said pin engages said axial cam end face during connection of said lead screw to said coupling means.

30. The improvement according to claim 27 wherein said spindle has a drive gear non-rotatively fast thereto, and said gear train means includes a driven gear non-rotatively fast to said coupling means, a stud movable in a limited arcuate path concentric with the axis of said driven gear, an idler gear assembly mounted on said stud and rotatable about the axis thereof and in constant engagement with said driven gear and arranged to move in and out of engagement with said drive gear upon movement of said stud along said path, and means operative to move said stud along said path in one direction to effect engagement of said idler gear assembly with said drive gear when said lead screw is connected to said coupling means and operative to move said stud along said path in the opposite direction to effect disengagement of said idler gear assembly with said drive gear when said lead screw is disconnected from said coupling means.

31. The improvement according to claim 30 wherein a swing plate supports said stud, and said engage and disengage means includes a push rod longitudinally arranged and movable along said driven gear axis between a disengage position and an engage position, said push rod being in said disengage position when said lead screw is disconnected to said coupling means but being displaceable to said engage position by engagement with said lead screw when the latter is connected to said coupling means, means providing a fixed abutment with respect to which said plate is movable, a bell crank lever member mounted on said plate for pivotal movement about an axis transverse to and offset from said driven gear axis and having one lever end abuttingly contacting one end of said push rod and another lever end abuttingly engaging said abutment, yielding means constantly forcing said one lever end into the aforementioned abutting contact with said push rod thereby urging said push rod toward its said disengage position, and other yielding means constantly forcing said another lever end into the aforementioned abutting engagement with said abutment, said plate being in a gear disconnect position when said push rod is in its said disengage position and being in a gear connect position when said push rod is in its said engage position, movement of said push rod from its said disengage position to its said engage position pivoting said lever member to change the location of said another lever end relative to said plate thereby allowing said other yielding means to operate to swing said plate from its said gear disconnect position to its said gear connect position.

References Cited

UNITED STATES PATENTS

| | | | |
|---|---|---|---|
| 3,212,372 | 10/1965 | Knox | 77—32.5 X |
| 3,273,425 | 9/1966 | Hodgson | 77—32.3 |
| 3,286,555 | 11/1966 | Klancnik | 77—32.3 |
| 3,336,821 | 8/1967 | Firth | 77—32.8 X |

ANDREW R. JUHASZ, *Primary Examiner.*

G. WEIDENFELD, *Assistant Examiner.*

U.S. Cl. X.R.

77—32.3, 32.5, 32.8, 33.5; 10—139; 91—27, 28, 31